(12) United States Patent (10) Patent No.: US 8,108,833 B2
Dellas et al. (45) Date of Patent: Jan. 31, 2012

(54) AUTOMATICALLY GENERATING A GRAPHICAL DATA FLOW PROGRAM FROM A STATECHART

(75) Inventors: Christina M. Dellas, Austin, TX (US); Nicholas G. Neumann, Austin, TX (US); Toga Hartadinata, Austin, TX (US); Kevin M. Hogan, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1141 days.

(21) Appl. No.: 11/748,822

(22) Filed: May 15, 2007

(65) Prior Publication Data

US 2008/0263515 A1 Oct. 23, 2008

Related U.S. Application Data

(60) Provisional application No. 60/913,001, filed on Apr. 20, 2007.

(51) Int. Cl.
*G06F 9/44* (2006.01)
(52) U.S. Cl. ...................................................... 717/109
(58) Field of Classification Search .................... 717/109
See application file for complete search history.

(56) References Cited

U.S. PATENT DOCUMENTS

| 5,563,991 | A | 10/1996 | Mahoney |
| 5,603,018 | A | 2/1997 | Terada et al. |
| 5,870,590 | A | 2/1999 | Kita et al. |
| 5,920,718 | A | 7/1999 | Uczekaj et al. |
| 5,966,532 | A | 10/1999 | McDonald et al. |
| 6,118,448 | A | 9/2000 | McMillan et al. |
| 6,138,171 | A | 10/2000 | Walker |
| 6,212,672 | B1 | 4/2001 | Keller et al. |
| 6,219,628 | B1 | 4/2001 | Kodosky et al. |
| 6,285,976 | B1 * | 9/2001 | Rotbart ............................ 703/17 |
| 6,366,300 | B1 | 4/2002 | Ohara et al. |
| 6,405,361 | B1 | 6/2002 | Broy et al. |
| 6,499,136 | B1 | 12/2002 | Dempsey et al. |
| 6,880,147 | B1 | 4/2005 | Pauly |
| 7,020,850 | B2 | 3/2006 | Raghavan et al. |
| 7,120,876 | B2 * | 10/2006 | Washington et al. ......... 715/763 |

(Continued)

OTHER PUBLICATIONS

J W Schmidt Florian Matthes, "State Diagrams", 1999, retrieved from http://www.sts.tu-harburg.de/teaching/ws-99.00/OOA+D/StateDiagrams.pdf on May 31, 2011.*

(Continued)

*Primary Examiner* — Philip Wang
(74) *Attorney, Agent, or Firm* — Meyertons Hood Kivlin Kowert & Goetzel, P.C.; Jeffrey C. Hood; Jason L. Burgess

(57) ABSTRACT

A system and method for automatically generating a graphical data flow program from a statechart are disclosed. The statechart may be created in a graphical manner in response to user input, e.g., in response to the user arranging state icons on a display and creating interconnections representing transitions among the respective states. The statechart may include at least one hierarchical state, where each hierarchical state includes one or more sub-states. A graphical data flow program may be automatically generated from the statechart. The graphical data flow program may include a plurality of interconnected nodes that visually indicate functionality of the graphical data flow program, where connections among the nodes visually indicate data flow among the nodes. The graphical data flow program may be executable to implement the functionality of the statechart.

18 Claims, 32 Drawing Sheets

U.S. PATENT DOCUMENTS

| | | | |
|---|---|---|---|
| 7,197,739 | B2 | 3/2007 | Preston et al. |
| 7,200,838 | B2 * | 4/2007 | Kodosky et al. ............. 717/116 |
| 7,840,913 | B1 * | 11/2010 | Agrawal et al. ................. 703/22 |
| 2002/0070968 | A1 | 6/2002 | Austin et al. |
| 2003/0167455 | A1 | 9/2003 | Iborra et al. |
| 2005/0091602 | A1 | 4/2005 | Ramamoorthy et al. |
| 2007/0168943 | A1 | 7/2007 | Marini et al. |

OTHER PUBLICATIONS

Eva Magnusson; "State diagram Generation" term paper in the graduate course Attribute Grammars; Spring 1999; 21 pages; Lund University.

Simona Vasilache and Jiro Tanaka; "Translating OMT State Diagrams with Concurrency into SDL Diagrams"; Aug. 28-31, 2000; 6 pages plus cover page; University of Tsukuba, Japan.

"Stateflow—For State Diagram Modeling" User's Guide, Version 4; Copyright 1997-2001; pp. 1 through 8-10; The Math Works, Inc.

"Stateflow—For State Diagram Modeling" User's Guide, Version 4; Copyright 1997-2001; pp. 8-11 through I-16; The Math Works, Inc.

T. Dean Hendrix and James H. Cross; Language Independent Generation of Graphical Representations of Source Code; Proceedings of the 1995 ACM 23rd annual conference on Computer Science; 1995; pp. 66-72.

Hugo Andrade and Scott Kovner; "Software Synthesis from Dataflow models for G and LabVIEW"; IEEE Asilomar Conference on Signals, Systems, and Computers; Nov. 1998; pp. 1705-1709; vol. 2.

K. N. Whitley and Alan F. Blackwell; "Visual Programming: The Outlook from Academia and Idustry";Seventh workshop on Empirical studies of programmers; Oct. 1997; pp. 180-208.

David Harel and Eran Gery; "Executable Object Modeling with Statecharts"; IEEE Computer; Jul. 1997; pp. 31-42; vol. 30, No. 7.

David Harel; "On Visual Formalisms"; Communications of the ACM; May 1988; pp. 514-530; vol. 31, No. 5.

David Harel; "Statecharts: A Visual Formalism for Complex Systems"; 1987; pp. 231-257; Elsevier Science Publishers B.V., North Holland.

\* cited by examiner

AUTOMATICALLY GENERATING A GRAPHICAL DATA FLOW PROGRAM FROM A STATECHART

PRIORITY CLAIM

This application claims priority to U.S. provisional patent application No. 60/913,001, titled, "Development Environment for Creating and Executing a Statechart", filed on Apr. 20, 2007.

FIELD OF THE INVENTION

The present invention relates to the field of computer software. More particularly, the invention relates to software that enables a user to graphically create a statechart, where the software is operable to automatically generate a graphical data flow program from the statechart.

DESCRIPTION OF THE RELATED ART

Traditionally, text-based programming languages have been used by programmers in writing application programs. Many different text-based programming languages exist, including BASIC, C, C++, Visual C++, Java, FORTRAN, Pascal, COBOL, ADA, APL, etc. Increasingly, computers are required to be used and programmed by those who are not highly trained in computer programming techniques. When traditional text-based programming languages are used, the user's programming skills and ability to interact with the computer system often become a limiting factor in the user's efficiency of creating a computer program.

Various programming models and paradigms that enable a user to create a program in a graphical manner without necessarily writing source code in a text-based programming language have been developed. In particular, graphical programming development environments enable a user to create a software program by including a plurality of nodes or icons in a block diagram and interconnecting the nodes or icons, e.g., such that the interconnected plurality of nodes or icons visually indicates functionality of the resulting software program (called a "graphical program"). The resulting interconnected nodes may visually indicate a function or process performed by the graphical program during its execution.

Another way of prototyping or specifying program functionality is by creating a statechart. A statechart is a diagram that visually indicates a plurality of states and transitions between the states. The diagram comprises state icons connected by wires, where the state icons represent states and the wires represent transitions between the states. One or more of the state icons may represent a hierarchical state, where a hierarchical state is a state that includes one or more sub-states.

SUMMARY

Various embodiments of a system and method for automatically generating a graphical data flow program from a statechart are disclosed. The statechart may be created in a graphical manner in response to user input. For example, creating the statechart may comprise displaying a plurality of state icons on a display device in response to user input and displaying a plurality of connector elements interconnecting the state icons on the display device in response to user input. The state icons may represent a plurality of states in the statechart. The connector elements may represent transition between the states. The statechart may include at least one hierarchical state, where each hierarchical state includes one or more sub-states.

The statechart may specify execution functionality. For example, the user may define actions to be executed, such as enter actions to be executed when a state is entered, exit actions to be executed when a state is exited, and/or transition actions to be executed when a transition is followed.

The method may further comprise automatically generating a graphical data flow program from the statechart. The graphical data flow program may include a plurality of interconnected nodes that visually indicate functionality of the graphical data flow program, where connections among the nodes visually indicate data flow among the nodes. The graphical data flow program may be executable to implement the functionality of the statechart.

BRIEF DESCRIPTION OF THE DRAWINGS

A better understanding of the present invention can be obtained when the following detailed description of the preferred embodiment is considered in conjunction with the following drawings, in which.

Figure 1:
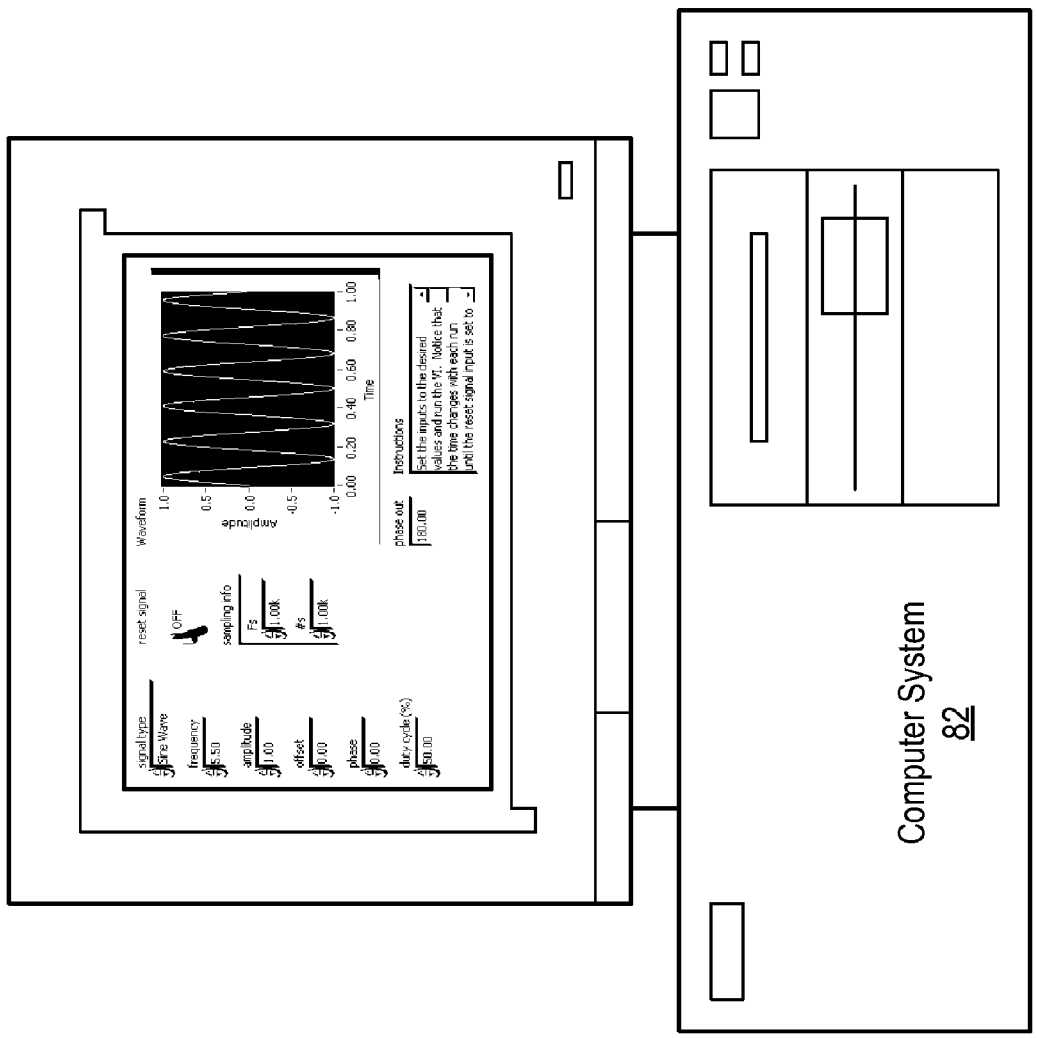
FIG. 1 illustrates an example of a computer system that may execute a statechart development environment application.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 7,200,838 titled "System and Method for Automatically Generating a Graphical Program in Response to a State Diagram," issued on Apr. 3, 2007.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000, which issued as U.S. Pat. No. 7,210,117 on Apr. 24, 2007.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/System-Build™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes (not to be confused with the nodes that connect components in a circuit diagram).

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics.

Wires may indicate communication of data, timing information, status information, control information, and/or other information between icons. In some embodiments, wires may have different visual appearances which may indicate different characteristics of the wire (e.g., type of data exchange semantics, data transfer protocols, data transfer mediums, and/or type of information passed between the icons, among others).

Graphical Data Flow Program (or Graphical Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Statechart—A diagram that visually indicates a plurality of states and transitions between the states. The diagram comprises state icons connected by wires, where the state icons represent states and the wires represent transitions between the states.

One or more of the state icons may represent a hierarchical state, where a hierarchical state is a state that includes one or more sub-states. For example, a statechart may include a state (a superstate) which includes states (sub-states). The sub-states may be AND states (e.g., parallel or concurrently active states) or OR states (e.g., states which are not concurrently active). The statechart may also include pseudostates (e.g., forks, joins, and/or junctions).

The statechart may be represented in the memory of the computer system as data structures and/or program instructions. The representation of the statechart stored in memory corresponds to the diagram and is either 1) executable; 2) operable to be converted to an executable program; or 3) interpretable, to perform the functionality indicated by the diagram.

A "State Diagram" is a type of statechart which does not have hierarchical states. Various embodiments of a software application operable to create a statechart in response to user input are described herein. The software application is referred to herein as a statechart development environment application, or simply a statechart development environment.

In various embodiments the statechart development environment may be operable to implement various ones of the methods described below.

The statechart development environment application may be executed by a computer system. For example, FIG. 1 illustrates an example of a computer system 82 that may execute the statechart development environment application. The computer system 82 may include a memory medium(s) on which various computer programs, software components, and data structures are stored. In particular, the memory medium may store the statechart development environment application, which may be executed by one or more processors of the computer system 82. The memory medium may also store one or more data structures that represent a statechart created by the statechart development environment. The memory medium may also store operating system software, as well as other software for operation of the computer system.

As shown in FIG. 1, the computer system 82 may also include a display device operable to display a statechart, e.g., where the statechart is created in response to user input received to the statechart development environment. For example, the user input may be received via an input device such as a mouse, keyboard, or other input device.

In some embodiments the statechart development environment may enable a user to create a statechart in a graphical manner. For example, the statechart development environment may include a graphical editor that enables the user to create the statechart by displaying and arranging state icons in the statechart, where each state icon represents a state. The graphical editor may also enable the user to display wires (also referred to as connector elements) that interconnect the state icons. Each wire (or connector element) may connect two state icons and represent a transition between the two states represented by the state icons.

Figure 2:
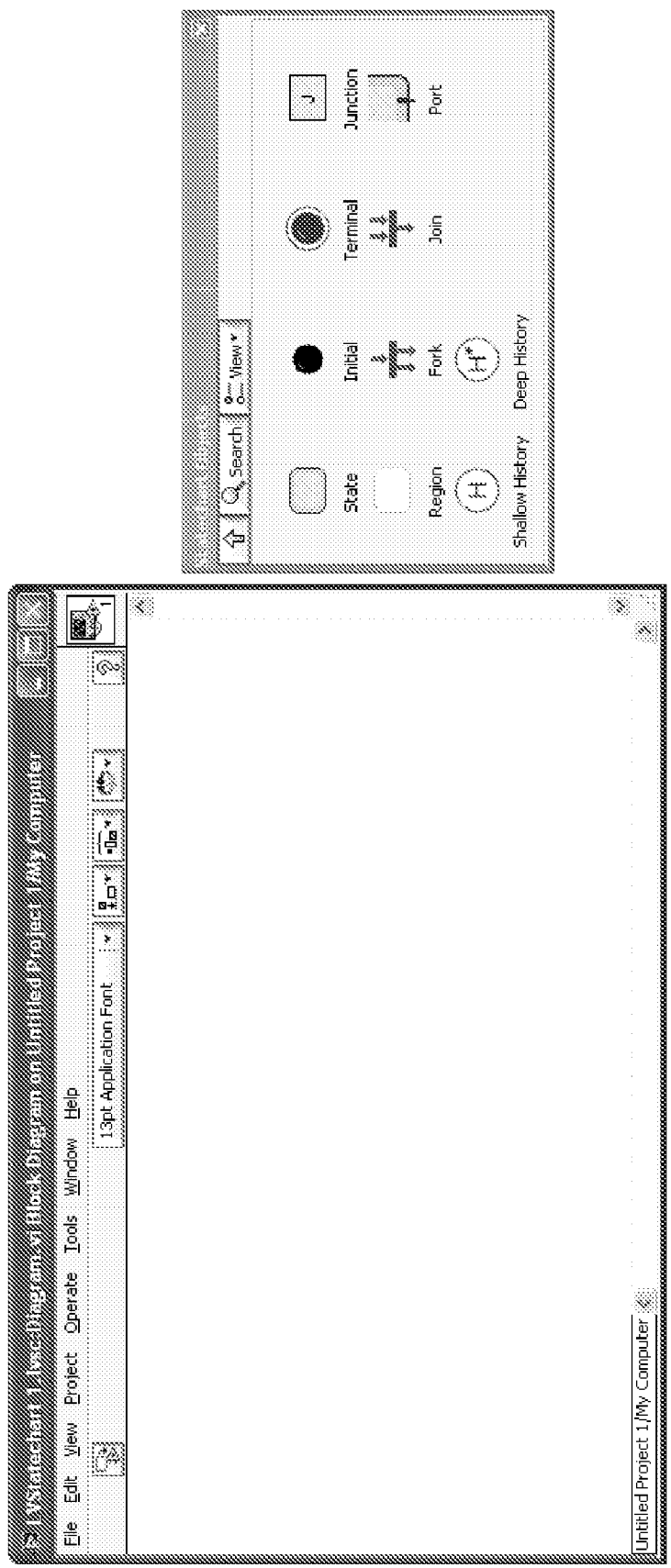
FIG. 2 illustrates an example of a graphical editor that enables a user to create a statechart in a graphical manner.

FIG. 2 illustrates an example of a graphical editor. The window on the left represents a diagram window in which the statechart is displayed. (This window is currently blank, indicating that the user has not yet begun creating the statechart.) The window on the right provides a palette of graphical elements which the user may include in the statechart, e.g., by dragging and dropping them into the window on the left. Each graphical element represents a respective type of statechart element, such as a state, a terminal, a history element, etc.

Figure 3:
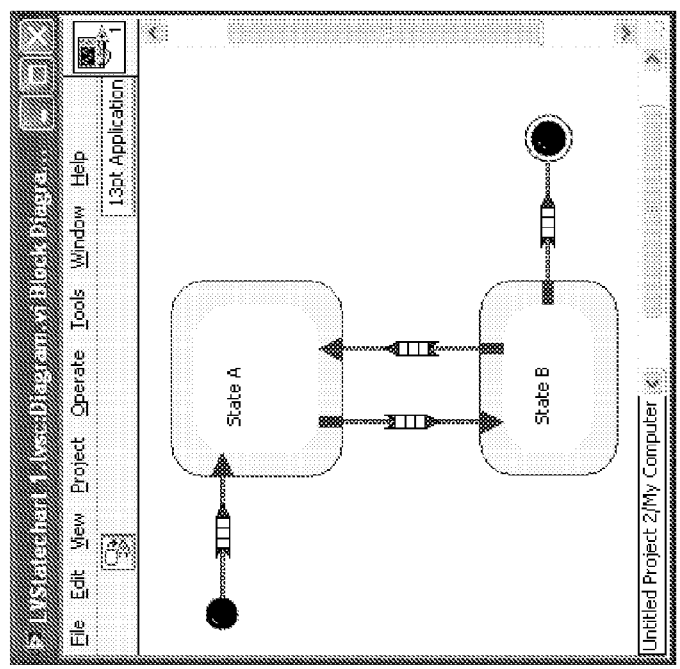
FIGS. 3 and 4 illustrate examples of statecharts which a user has created by interacting with the graphical editor of FIG. 2.

FIG. 3 illustrates one example of a statechart which a user has created by interacting with the graphical editor of FIG. 2. In this example the statechart has two states, State A and State B, represented by respective state icons. The statechart is configured to transition between State A and State B until a stop trigger is received.

Figure 4:
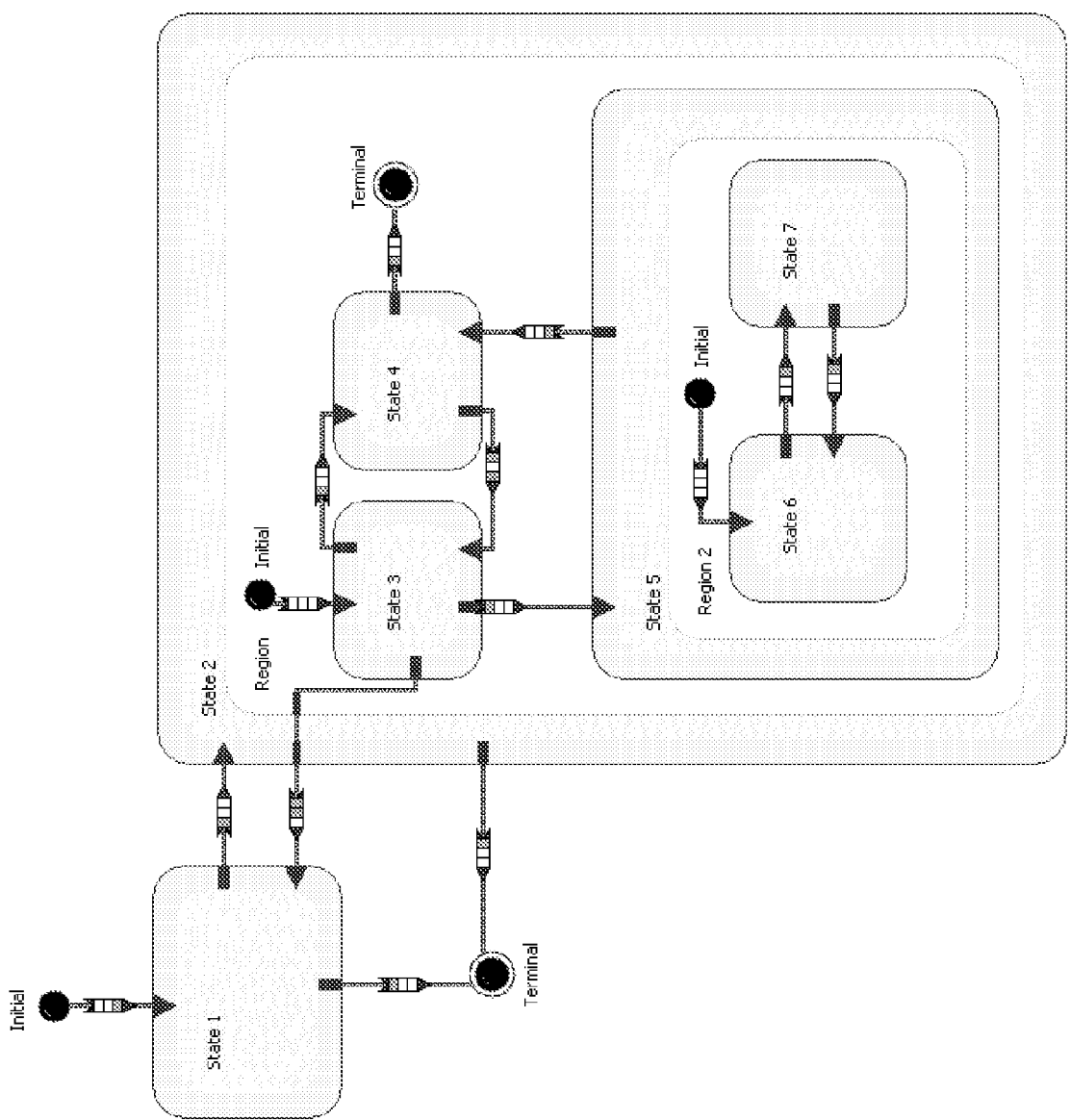

FIG. 4 illustrates another example of a statechart which a user has created by interacting with the graphical editor of FIG. 2. In this example, the statechart includes two main states, labeled State 1 and State 2. State 2 is a hierarchical state (also referred to as a superstate) that contains the sub-states State 3, State 4, and State 5. State 5 is also a hierarchical state that contains the sub-states State 6 and State 7. Thus, states in a statechart can be nested to various degrees as desired by the user for a particular application.

In other embodiments the user may provide textual input to the statechart development environment and a statechart may be created based on the textual input. The textual input may fully specify the statechart or may partially specify the statechart. Partially specifying the statechart may include specifying desired functionality and/or portions of the states/transitions of the statechart. In one embodiment, the user may provide input to a GUI or series of GUIs (e.g., in a wizard) in order to specify the statechart. The statechart may be automatically displayed in response to receiving the user input. Note that in this embodiment automatic display of the statechart does not require user input manually assembling state icons and wires (e.g., according to the methods described above).

The statechart development environment may also be operable to execute a statechart which has been created in response to user input. In various embodiments the statechart may be either 1) directly executable; 2) operable to be converted to an executable program; or 3) interpretable, to perform the functionality indicated by the diagram.

In some embodiments the statechart development environment may be operable to automatically convert the statechart into a computer program, e.g., automatically generate a computer program representing the statechart. In such embodiments, executing the statechart may comprise executing the automatically generated computer program. For example, the statechart development environment may be operable to automatically convert the statechart into a graphical data flow program, which may then be compiled for execution.

In some embodiments, automatically generating the computer program may comprise automatically generating executable program instructions, e.g., program instructions that are directly executable by a processor. In other embodiments, automatically generating the computer program may comprise automatically generating source code for the computer program, e.g., where the source code may then be compiled or interpreted into executable program instructions. Automatically generating the computer program may comprise generating or creating at least a portion of the program code (e.g., executable program instructions or source code) for the computer program without user input specifying the at least a portion of program code.

In various embodiments the statechart development environment may be operable to automatically generate any of various kinds of programs representing a statechart. In some embodiments the statechart development environment may automatically generate a text-based program representing the statechart, such as a program written in C or another text-based programming language. In other embodiments the statechart development environment may automatically generate a graphical program representing the statechart. For example, the statechart development environment may automatically generate a graphical data flow program representing the statechart.

Figure 5:
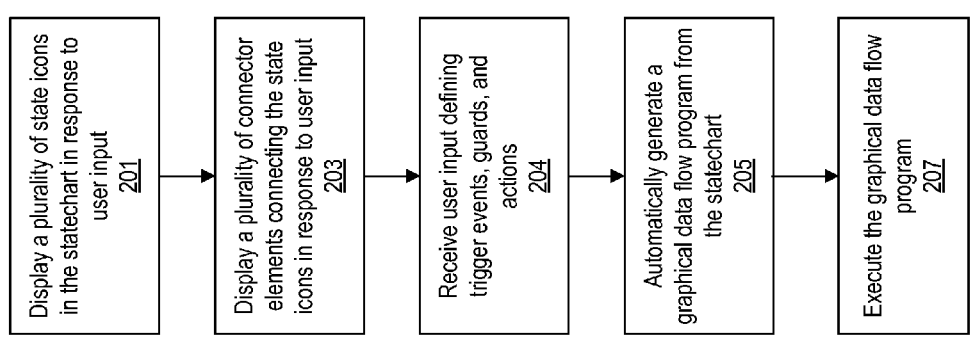
FIG. 5 is a flowchart diagram illustrating one embodiment of a method in which a user interacts with the statechart development environment to create a statechart in a graphical manner, and the statechart development environment automatically converts the statechart into a graphical data flow program.

FIG. 5 is a flowchart diagram illustrating one embodiment of a method in which a user interacts with the statechart development environment to create a statechart in a graphical manner, and the statechart development environment automatically converts the statechart into a graphical data flow program.

As indicated in 201, a plurality of state icons may be displayed in the statechart in response to user input. In some embodiments, at least one of the state icons may be a hierarchical state icon, e.g., a state icon that represents a hierarchical state having one or more sub-states. The hierarchical state icons may visually indicate that they represent hierarchical states. For example, in some embodiments a hierarchical state icon may include sub-icons that visually indicate the sub-states. For example, in FIG. 4 the state icon representing State 2 is a hierarchical state icon which includes sub-icons representing the sub-states of State 2 (State 3, State 4, and State 5). In this example, the state icon representing State 5 is also a hierarchical state icon which includes sub-icons representing the sub-states of State 5 (State 6 and State 7).

As indicated in 203, a plurality of connector elements connecting the state icons may also be displayed in response to user input. A connector element is any kind of graphical element that connects two state icons. Each connector element may represent a transition between the two states represented by the respective state icons. In some embodiments a connector element may comprise a wire.

As indicated in 204, user input defining other aspects of the statechart, such as trigger events, guards, and actions may also be received.

A trigger event, also referred to herein as simply a trigger, is an event to which the statechart reacts. For example, a trigger event can be generated in response to a user interacting with a GUI element (e.g., by clicking a button) or in response to a value change. For each transition between states in the statechart, the user may specify which trigger events cause the transition. Similarly, for each static reaction within a state, the user may specify which trigger events cause the static reaction to be performed. In some embodiments, a trigger event may be generated internally by the statechart itself. In some embodiments, a trigger event may also or may alternatively be generated externally to the statechart, e.g., by another program. Thus, a statechart may receive internal and/or external trigger events.

In some embodiments, the user may combine the trigger events into groups. The user may configure a transition or static reaction to react to a group such that any trigger event in that group can initiate the transition or static reaction.

The user may also define various kinds of actions for the statechart. For example, the user may define entry actions for states in the statechart. An entry action for a given state is an action that is performed upon entering the state, e.g., after completing a transition from another state. For example, the user may specify program source code defining code to be executed when the state is entered. As described below, in some embodiments the user may define the entry action for a state as a portion of graphical data flow code that is executed when the state is entered. In other embodiments the user may define the entry action using other types of source code, such as C source code or source code in another text-based programming language.

The user may also define exit actions for states in the statechart. An exit action for a given state is an action that is performed upon exiting the state, e.g., before completing a transition to another state. For example, the user may specify graphical data flow code or other program source code to be executed when the state is exited.

The user may also define transition actions for transitions in the statechart. A transition action for a given transition is an action that is performed when the transition is followed, e.g., when the statechart moves from its current state to a destination state specified by the transition. For example, the user may specify graphical data flow code or other program source code to be executed when the transition is taken.

The user may also define static reactions for states in the statechart. A static reaction for a given state is an action that is performed when the state is active and no transitions from the state are taken. The user may define multiple static reactions for a given state. Each static reaction may be associated with one or more of the trigger events. Thus, the static reactions that are performed when a trigger event is received may depend on which static reactions the trigger event is associated with.

The user may also define guard conditions (also referred to as simply guards) for the static reactions in the statechart. A guard condition or guard for a static reaction is logic that can prevent the static reaction from being performed. For example, the user may specify program source code defining logic that evaluates to either True or False in order to decide whether to perform the static reaction. Thus, in response to receiving a given trigger event, the guards for each of the static reactions with which the trigger event is associated may be evaluated. For any guard that returns True, the respective static reaction may be executed.

The user may also define guards for transitions in the statechart. A guard for a transition is logic that can prevent the transition from being taken. For example, the user may specify program source code defining logic that evaluates to either True or False in order to decide whether to take the transition when a trigger event associated with the transition is received. Thus, in response to receiving a given trigger event, the guard for the transition with which the trigger event is associated may be evaluated, and the transition may be taken if and only if the guard returns True.

As described below, in some embodiments the user may define a guard for a transition or static reaction as a portion of graphical data flow code. In other embodiments the user may define the guard using other types of source code, such as C source code or source code in another text-based programming language.

As indicated in 205, in some embodiments the statechart development environment may be operable to automatically generate a graphical data flow program from the statechart. Automatically generating the graphical data flow program may include automatically generating a plurality of interconnected nodes that visually indicate functionality of the graphical data flow program, where connections among the nodes visually indicate data flow among the nodes. For example, the plurality of interconnected nodes may be included in a block diagram of the graphical program.

Thus, in automatically generating the graphical data flow program, the statechart development environment may include various objects in the graphical data flow program, such as various types of nodes (e.g., function nodes, sub-program nodes, structure nodes, etc.), as well as including wires or lines that interconnect the nodes according to a data flow format.

In some embodiments the generated graphical data flow program may follow left-to-right data flow semantics. For example, for any pair of node where one node passes output data as input to the other node, the node that generates the output data may appear in the graphical data flow program to the left of the node which receives the data as input. Following left-to-right data flow semantics may enable a user to more easily tell how data flows among nodes in the graphical data flow program.

In some embodiments, the generated graphical data flow program may be targeted toward a particular graphical programming environment. Thus, in automatically generating the graphical data flow program, the statechart development environment may utilize features of a particular graphical programming environment or create files or data structures that are formatted or structured in a manner expected by the graphical programming environment. Examples of graphical programming environments include LabVIEW, BridgeVIEW, DasyLab, and DiaDem from National Instruments, VEE from Agilent, Simulink from The MathWorks, Softwire from Measurement Computing, Inc., Sanscript from Northwoods Software, WiT from Coreco, and Vision Program Manager from PPT Vision, among others.

When a user interactively develops a graphical data flow program from within a graphical programming environment, the graphical programming environment may create one or more files or data structures representing the graphical data flow program. For example, the program files may specify information such as a set of nodes included in the graphical data flow program and interconnections among these nodes. In some embodiments, automatically generating the graphical data flow program may comprise generating one or more files or data structures representing the graphical data flow program. For example, these files or data structures may be structured or formatted appropriately for a particular graphical programming environment, as mentioned above.

In some embodiments the statechart development environment may be operable to automatically generate different graphical data flow programs from a given statechart, depending on what kind of target device that user wants the graphical data flow program to execute on. For example, in some embodiments the statechart development environment may enable the user to select a target device, such as a general purpose computer system, FPGA device, real-time computer system, or other type of device. The statechart development environment may generate the generated graphical data flow program such that the program executes correctly on the selected target device.

Referring again to FIG. 5, in 207 the graphical data flow that is automatically generated in 205 may be executed, e.g., in order to execute the statechart. In some embodiments the graphical data flow program may be executed as a standalone program, e.g., a program that does not perform input/output with other programs. In other embodiments the graphical data flow program may execute in conjunction with other programs. As one example, in some embodiments another graphical data flow program (e.g., a graphical data flow program other than the one automatically generated in 205) may be operable to generate various trigger events defined in the statechart, and these external trigger events may be received and processed by the automatically generated graphical data flow program that represents the statechart.

Figure 6:
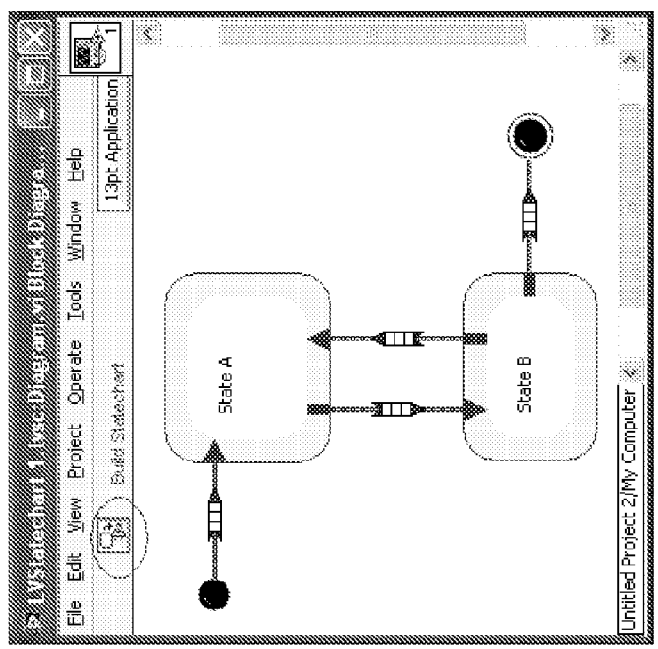
FIG. 6 illustrates the editor window shown in FIG. 4, where the user clicks a "Build Statechart" button to request the statechart to be converted to the graphical data flow program.

In some embodiments the statechart development environment may automatically generate the graphical data flow program from the statechart in 205 in response to the user requesting the graphical data flow program to be generated. For example, the user may select a menu item from a graphical user interface of the statechart development environment or provide other user input requesting the graphical data flow program to be generated. For example, FIG. 6 illustrates the editor window shown in FIG. 4, where the user clicks a "Build Statechart" button to request the statechart to be converted to the graphical data flow program. In response to the user clicking the button, the statechart development environment performs an algorithm to automatically generate the graphical data flow program from the statechart.

In other embodiments the statechart development environment may automatically generate the graphical data flow program from the statechart invisibly to the user. For example, the user may select a menu item from a graphical user interface of the statechart development environment or provide other user input to begin execution of the statechart. In response to the user input to execute the statechart, the statechart may be first be converted to a graphical data flow program, and then compiled (or interpreted) for execution. The fact that the statechart was first converted to a graphical data flow program and then compiled may be invisible to the user, and the user may not know that graphical data flow program conversion has occurred, and correspondingly may never actually see the graphical data flow program. In other embodiments, this conversion is performed, and the user is allowed to see the resulting graphical data flow program.

Figure 7:
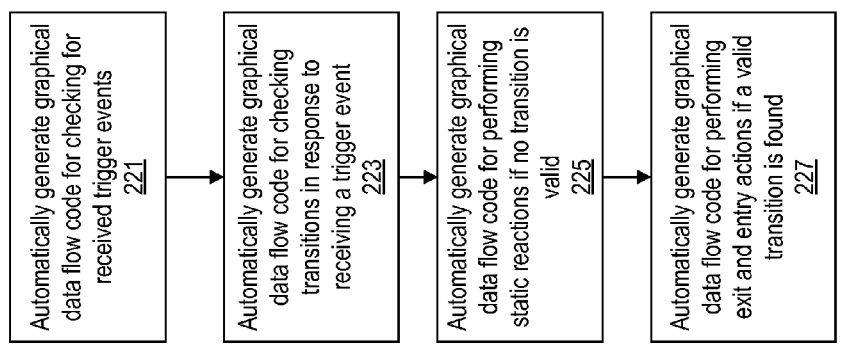
FIG. 7 is a flowchart diagram illustrating one embodiment of a method for automatically generating a graphical data flow program from a statechart.

FIG. 7 is a flowchart diagram illustrating one embodiment of a method for automatically generating the graphical data flow program from the statechart. It is noted that the flowchart of FIG. 7 illustrates one example of functions performed by the automatically generated graphical data flow, and in other embodiments the generated graphical data flow may operate in various other ways, and thus, the graphical data flow itself may be generated differently.

As indicated in 221, the statechart development environment may automatically generate graphical data flow code for checking for received trigger events. For example, the statechart development environment may automatically include a portion of graphical data flow code (e.g., nodes or icons interconnected in a data flow format) in the graphical data flow program, where the code is operable to check for trigger events that have been generated. The code may check for external trigger events that have been generated externally to the statechart and/or internal trigger events that have been generated internally in the statechart.

As indicated in 223, the statechart development environment may also automatically generate graphical data flow code for checking transitions in response to receiving a trigger event. For example, when the code generated in 221 discovers that a trigger event has been generated, the code that is generated in 223 may execute to check to see whether any transitions should be followed. For example, the code may execute the guards for the transitions associated with the currently active state and the received trigger event in order to determine if any of the guards return True.

As indicated in 225, the statechart development environment may also automatically generate graphical data flow code for performing static reactions if no transition if valid. For example, if the code generated in 223 does not find any transitions with guards that return True then the code generated in 225 may invoke execution of the static reactions that have been configured for the current state. As discussed above, each static reaction may be performed only if its corresponding guard evaluates to True.

As indicated in 227, the statechart development environment may also automatically generate graphical data flow code for performing exit and entry actions if a valid transition is found. For example, if the code generated in 223 finds a transitions with a guard that returns True then the exit actions that have been configured for the current state may be executed, and the entry actions that have been configured for the new state specified by the transition may also be executed.

As discussed above, the guards, entry actions, exit actions, and static reactions may be defined by the user himself. In embodiments where the user defines these aspects of the statechart using graphical data flow code, the statechart development environment may operate to automatically include the user-specified graphical data flow code in the graphical data flow program that is automatically generated in 205, or may include a reference to the user-specified graphical data flow code in the automatically generated graphical data flow program. For example, as noted above, if no valid transitions are found when a trigger event is received, the static reactions for the current state may be executed. Thus, for example, the portions of graphical data flow code that define the static reactions may be included in or referenced by the automatically generated graphical data flow program.

In other embodiments the user may define the guards, entry actions, exit actions, and static reactions using another type of program code other than graphical data flow code. As one example, the user may define these aspects of the statechart using C program code or program code written in another text-based programming language. In these embodiments the graphical data flow program that is automatically generated based on the statechart may be configured to invoke execute of the code portions defined by the user.

Thus, the various portions of automatically generated graphical data flow code discussed above with reference to FIG. 7 may provide a framework which operates in conjunction with the various portions of user-specified program code that define the guards, entry actions, exit actions, and static reactions. For example, the portions of automatically generated graphical data flow code discussed in FIG. 7 may operate in an iterative manner such that the graphical data flow program performs multiple iterations which include receiving a trigger event, checking for valid transitions, and performing static reactions or exit/entry actions. In this manner the automatically generated graphical data flow program may execute to make state transitions according to the received trigger events, the state/transition topology, and the other aspects defined by the statechart, such as guards, actions, static reactions, etc.

As discussed above, in addition to displaying and arranging state icons in a statechart and displaying connector elements (or wires) that represent transitions among the respective states, the user may also perform additional configuration for the statechart. In particular, the user may specify guard conditions for various transitions and/or static reactions. The user may also specify actions (e.g., entry actions, exit actions, transition actions, and static reactions) for various transitions.

In some embodiments the statechart development environment may enable the user to define a guard condition (also referred to as simply a guard) for a transition or static reaction as a portion of graphical data flow code. For example, the portion of graphical data flow code may include one or more graphical program nodes. Where there is a plurality of nodes, the nodes may be interconnected according to a graphical data flow model. For example, the nodes may be connected by lines or wires that visually indicate data flow among the nodes. Thus, the development environment for creating the statechart may allows the user to specify part of the functionality of the statechart using graphical data flow programming. This may provide a more convenient and intuitive mechanism to specify functionality for users, especially for users who are already familiar with graphical data flow programming techniques.

When specifying the graphical data flow code for a guard condition, the user may interact with a block diagram editor. For example, the block diagram editor may provide the user with a palette of various types of nodes or provide the user with access to the nodes in other ways. The user may select from available nodes and display and arrange them in a block diagram. The user may also connect the nodes with lines or wires to indicate data flow among the nodes. For example, each wire may connect an output terminal of one node to an input terminal of another node in order to visually indicate that output data produced by the first node is passed as input data to the second node.

The resulting graphical data flow code may visually indicate functionality of the guard condition. For example, the graphical data flow code for a guard condition for a transition may visually indicate a process performed by the guard condition in order to produce a Boolean result indicating whether or not the transition is valid, e.g., indicating whether or not the transition should be followed when a trigger event associated with the transition is received. Similarly, the graphical data flow code for a guard condition for a static reaction may visually indicate a process performed by the guard condition in order to produce a Boolean result indicating whether or not the static reaction should be performed when a trigger event associated with the static reaction is received.

Figure 8:
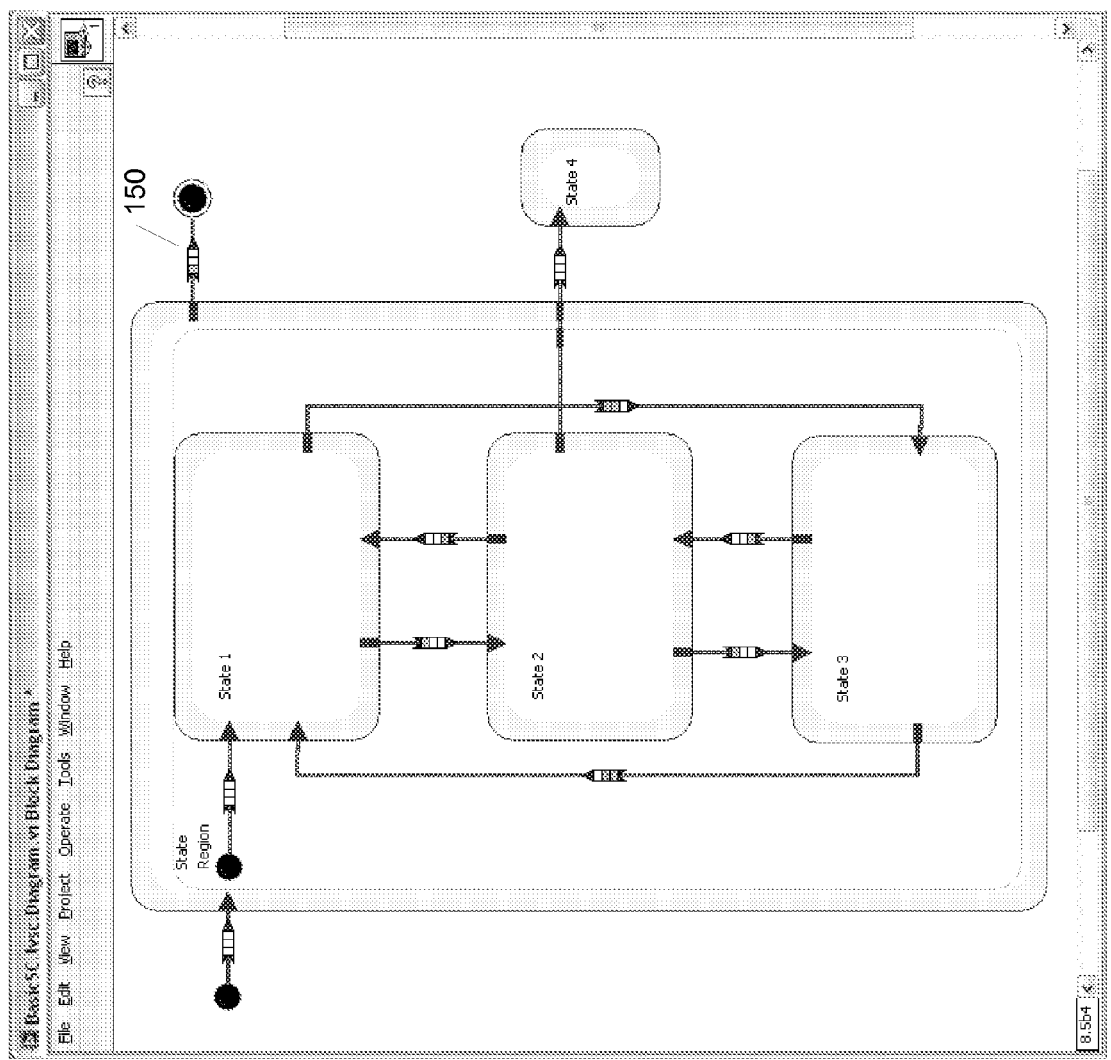
FIGS. 8 and 9 illustrate an example of a user causing a context menu to be displayed for a transition in a statechart, where the context menu includes a menu item that the user can select to configure the transition.
Figure 9:
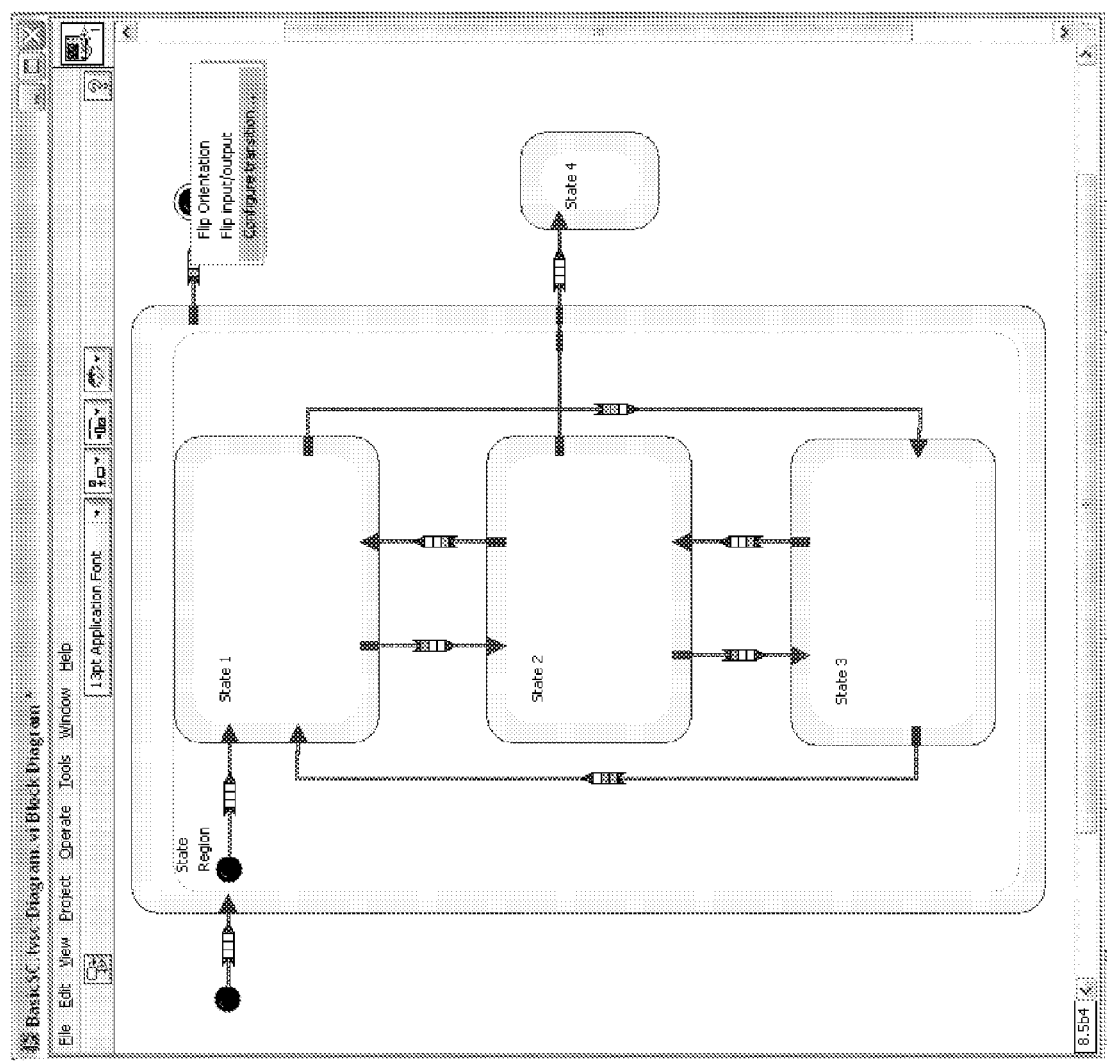

In some embodiments the block diagram in which the user creates the graphical data flow code for the guard condition may be integrated with a graphical editor in which the user graphically creates the statechart. For example, FIG. 8 illustrates an example of a graphical editor in which the user has created a statechart. In this example, in order to edit the guard code for a transition, the user may right-click on a logic node 150 associated with the transition in order to cause a pop-up context menu to be displayed. As shown in FIG. 9, the context menu may include a "Configure Transition . . . " menu item.

Figure 10:
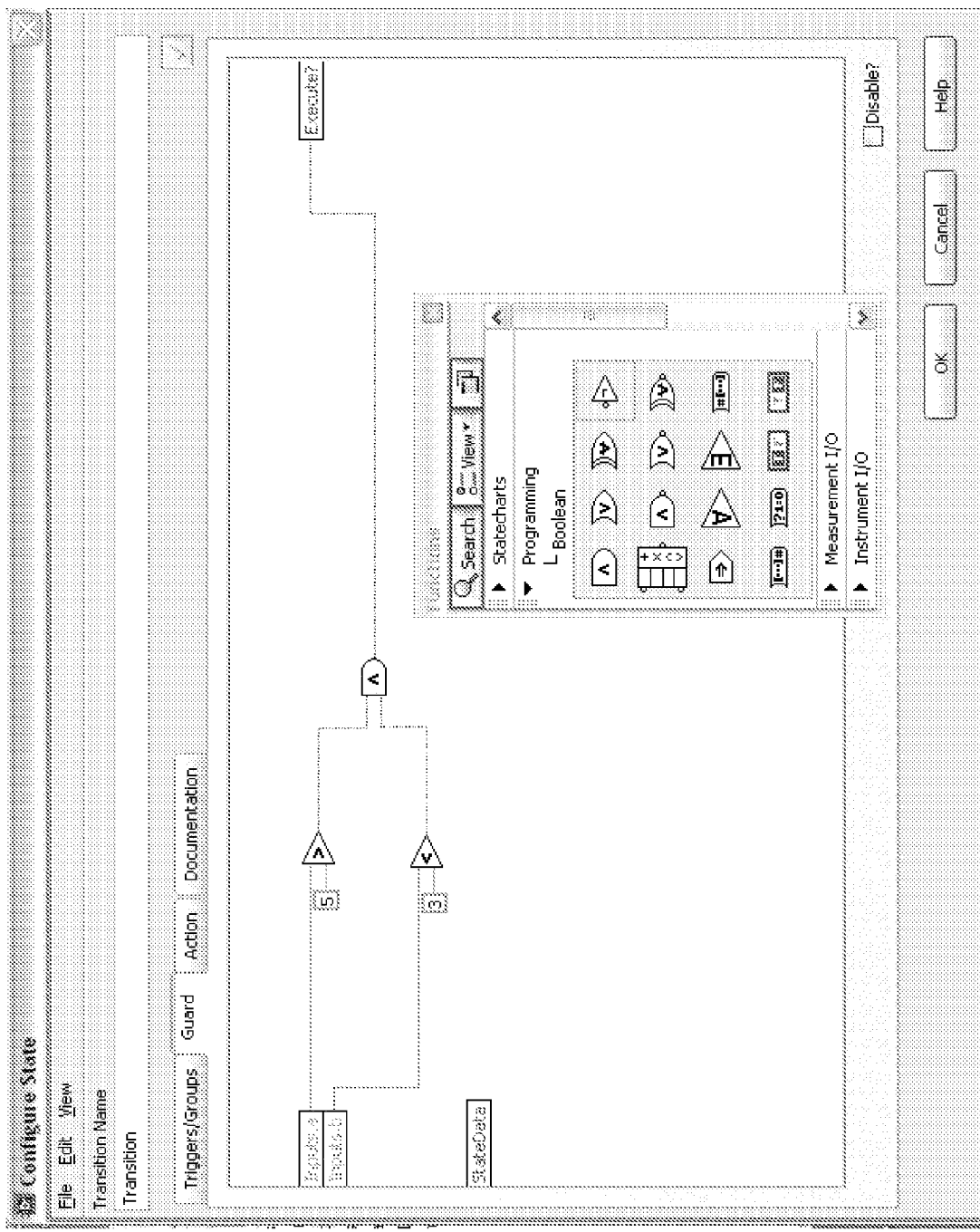
FIG. 10 illustrates an example of a transition configuration window.

The user may select the "Configure Transition . . . " menu item to cause a transition configuration window to appear. FIG. 10 illustrates an example of a transition configuration window. In this dialog, the user sees a tab control with four tabs. When the user clicks on the Guard tab, a panel for creating/editing graphical data flow for the guard condition is displayed. As shown in FIG. 10, the transition configuration window provides the user with a palette of graphical program nodes which the user can select from to include in the guard code.

In this example, the panel includes bundlers/unbundlers on the edges of the panel. These constructs allow the user-specified guard code to read and write the statechart's data. The user may create a portion of graphical data flow code that produces a Boolean result value and wire the Boolean result value to the Execute? member of the bundler on the right side of the panel. This tells the statechart whether or not the transition is valid.

In this simple example, the statechart is defined to have two numeric inputs (a) and (b), and the user has created a portion of graphical data flow code operable to evaluate whether a>5 and b<3. If so, the graphical data flow code produces a value of True, causing the transition to be followed. Thus, when the statechart evaluates this transition, it will execute the illustrated graphical data flow code representing the guard for the transition in order to determine whether to follow the transition, e.g., in order to determine whether to move from the current state to the destination state specified by the transition.

Figure 11:
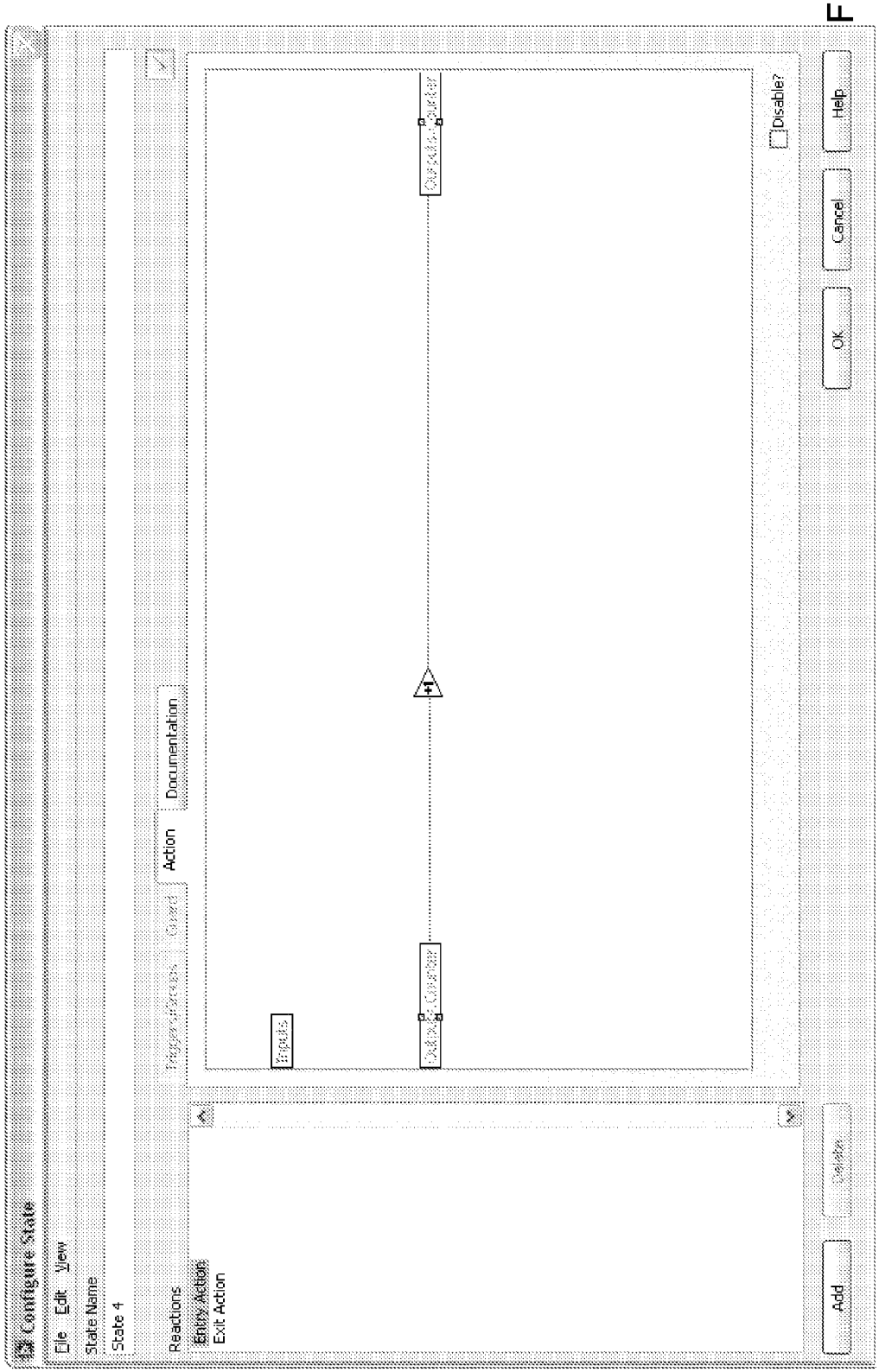
FIG. 11 illustrates an exemplary window for creating a portion of graphical data flow code defining an action for a given state.

An action, such as an entry action, exit action, transition action, or a static reaction, may be defined using graphical data flow code, in a similar manner as described above with respect to guard conditions. For example, FIG. 11 illustrates an exemplary window for creating a portion of graphical data flow code defining an action for a given state. The user may select the type of action, e.g., enter action, exit action, or static reaction being defined from the list on the left side of the window. (In this example, the option to define a static reaction does not appear in the list.) Instead of wiring Boolean data to a terminal as discussed above with reference to the guard code, the user may wire data to the State Data and/or Output values of the statechart.

Thus, in some embodiments the statechart development environment may embed a graphical data flow code editor (e.g., block diagram editor) within a graphical editor in which the user graphically creates a statechart. As noted above, the graphical data flow editor provides a more intuitive and simpler mechanism for specifying this type of functionality. The combination of the statechart editor and the data flow editor may help to provide a seamless experience when utilizing the two models of computation (statechart and data flow).

When a statechart executes, the statechart may process various events which cause the statechart to transition to different states. These events are also referred to herein as triggers or trigger events. In some embodiments, trigger events may be passed into a statechart from a source external to a statechart. For example, a program other than the statechart may send trigger events to the statechart.

Figure 12:
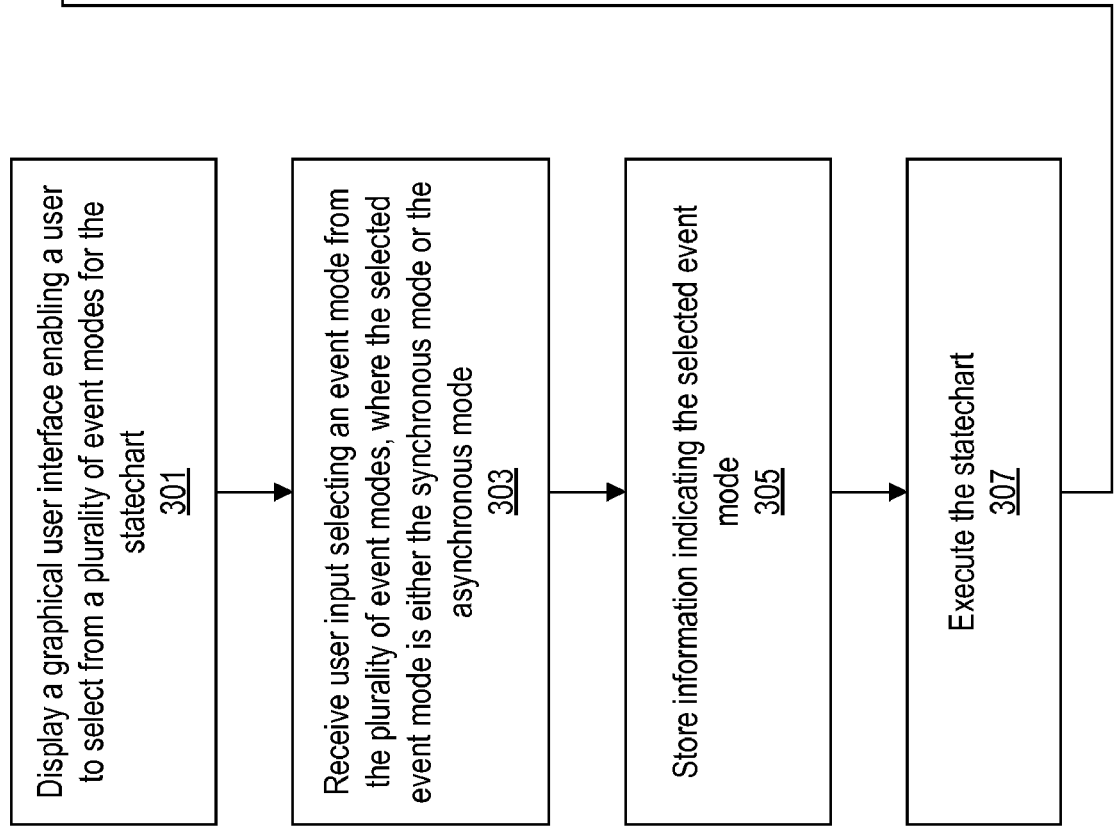
FIG. 12 is a flowchart illustrating an embodiment in which the user selects from a plurality of event modes for a statechart.

In some embodiments the statechart development environment may enable the user to configure a statechart to receive events either synchronously or asynchronously. For example, as illustrated in the flowchart of FIG. 12, in some embodiments the statechart development environment may display a graphical user interface enabling a user to select from a plurality of event modes for the statechart. The plurality of event modes may include a synchronous mode and an asynchronous mode.

In 303, the statechart development environment may receive user input selecting an event mode from the plurality of event modes. For example, the user may select either the synchronous mode or the asynchronous mode. Information indicating the selected event mode may be stored, as indicated in 305. For example, the statechart development environment may store a variable in memory or store information in a data structure indicating which event mode was selected.

When the statechart is executed, the statechart may receive events from an external source either synchronously or asynchronously, depending upon which event mode the user selected. For example, as indicated in 307 and 309, the statechart may be executed, and a program external to the statechart may be executed. As indicated in 311, the program may send one or more trigger events to the statechart. As indicated in 313, the statechart may receive the trigger events either synchronously or asynchronously, depending on which event mode was selected. For example, the statechart may receive the trigger events synchronously if the selected event mode is the synchronous mode. Similarly, the statechart may receive the trigger events asynchronously if the selected event mode is the asynchronous mode.

If a trigger event is sent from the external program to the statechart synchronously, the sending and receiving of the event is tied to the execution schedule of the statechart. Thus, the time at which the event is received by and processed by the statechart is relatively deterministic. For example, the program code in the external program which causes the event to be sent to the statechart may be tied together with the program code for the statechart so that the event causes the statechart to execute immediately in response to the event.

If, on the other hand, the trigger event is sent from the external program to the statechart asynchronously, the sending and receiving of the event is not directly tied to the execution schedule of the statechart, and it is relatively non-deterministic as to when the event will be received and processed by the statechart. For example, in some embodiments the external program may place the event in an event queue associated with the statechart. The statechart may pick up and process the event at some undetermined point. Thus, in this case, the event is sent from program code that is not directly tied to the execution schedule and event processing mechanism of the statechart. It is possible that events that are sent asynchronously to a statechart may be queued up behind other events until the prior events are processed.

In the asynchronous event mode, in some embodiments the queue implementation for the event queue associated with a statechart may be blocking, which means that the read code to read from the queue is put to sleep until an event arrives in the queue, and the read code is then awakened. In other embodiments the event queue may be implemented as a polling queue, where the read code periodically or iteratively checks the queue to see if a new event has arrived.

In some embodiments the statechart development environment may be operable to automatically generate source code operable to send one or more trigger events to a statechart and automatically include the generated source code in a program. For example, including the source code in a program may automatically configure the program to send one or more trigger events to the statechart. If the selected event mode is the synchronous mode then the automatically generated source code may be operable to send the events to the statechart synchronously. Similarly, if the selected event mode is the asynchronous mode then the automatically generated source code may be operable to send the events to the statechart asynchronously.

In various embodiments the statechart development environment may be operable to generate various types of source code, e.g., depending on which type of program will send the events to the statechart. For example, if the program is a text-based program then the statechart development environment may generate text-based source code, such as source code constructed in C or another programming language. If, on the other hand, the program is a graphical program then the statechart development environment may generate graphical source code, such as one or more nodes that operate in conjunction with a particular graphical programming environment. In some embodiments the statechart development environment may generate graphical data flow code, such as one or more nodes that operate in conjunction with LabVIEW or another graphical programming environment that utilizes a data flow model of computation.

Figure 13:
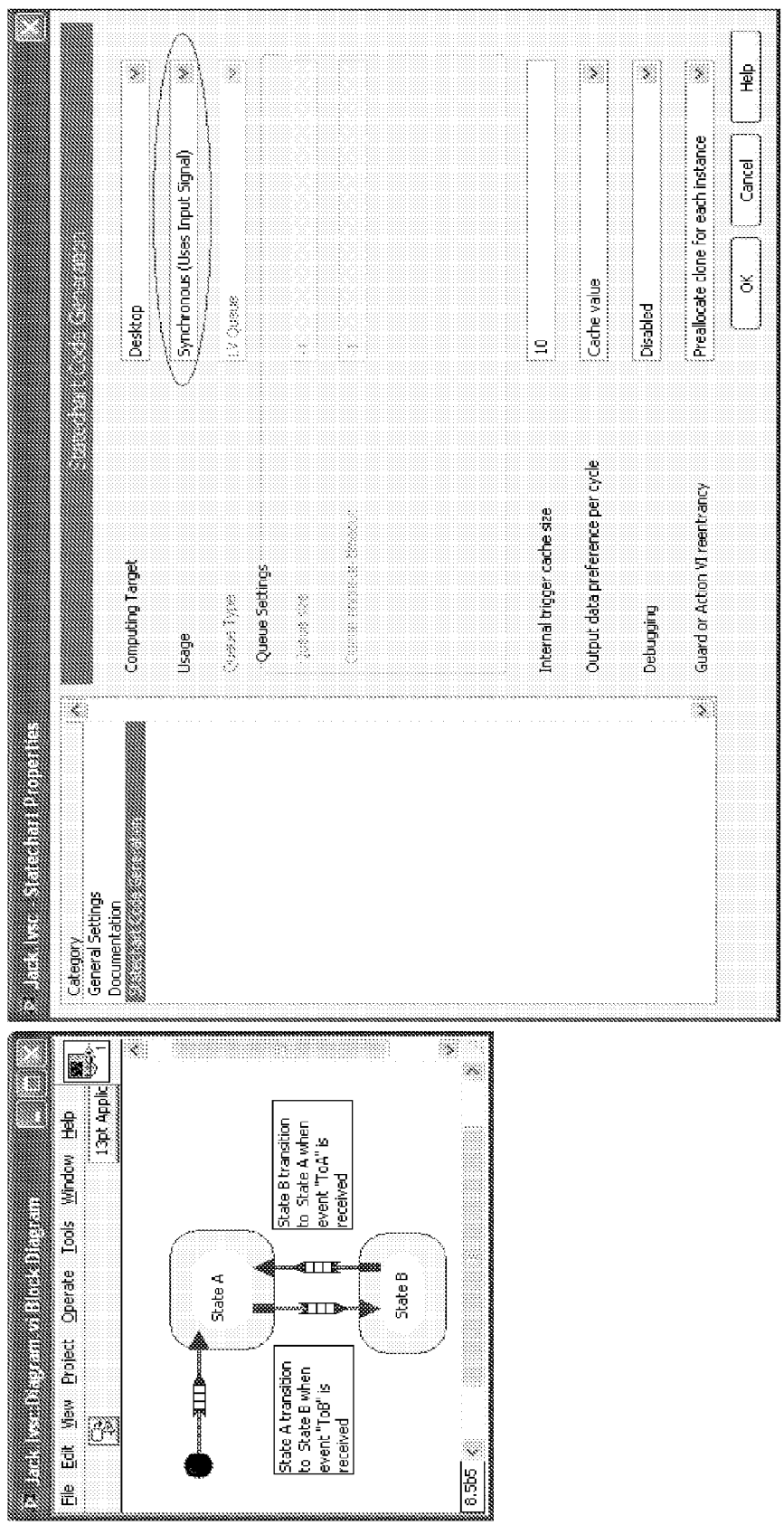
FIGS. 13 and 14 illustrate an example in which a user selects a synchronous event mode for a statechart.

FIG. 13 illustrates an example showing two windows. In the window on the left a statechart is displayed. The window on the right enables the user to specify various properties of the statechart. In particular, the "Usage" selection field allows the user to select an event mode, e.g., where the user can select either a synchronous mode or an asynchronous mode. In this example, the user has selected the synchronous mode. Thus, an external program may synchronously pass trigger events to the statechart, as described above.

Figure 14:
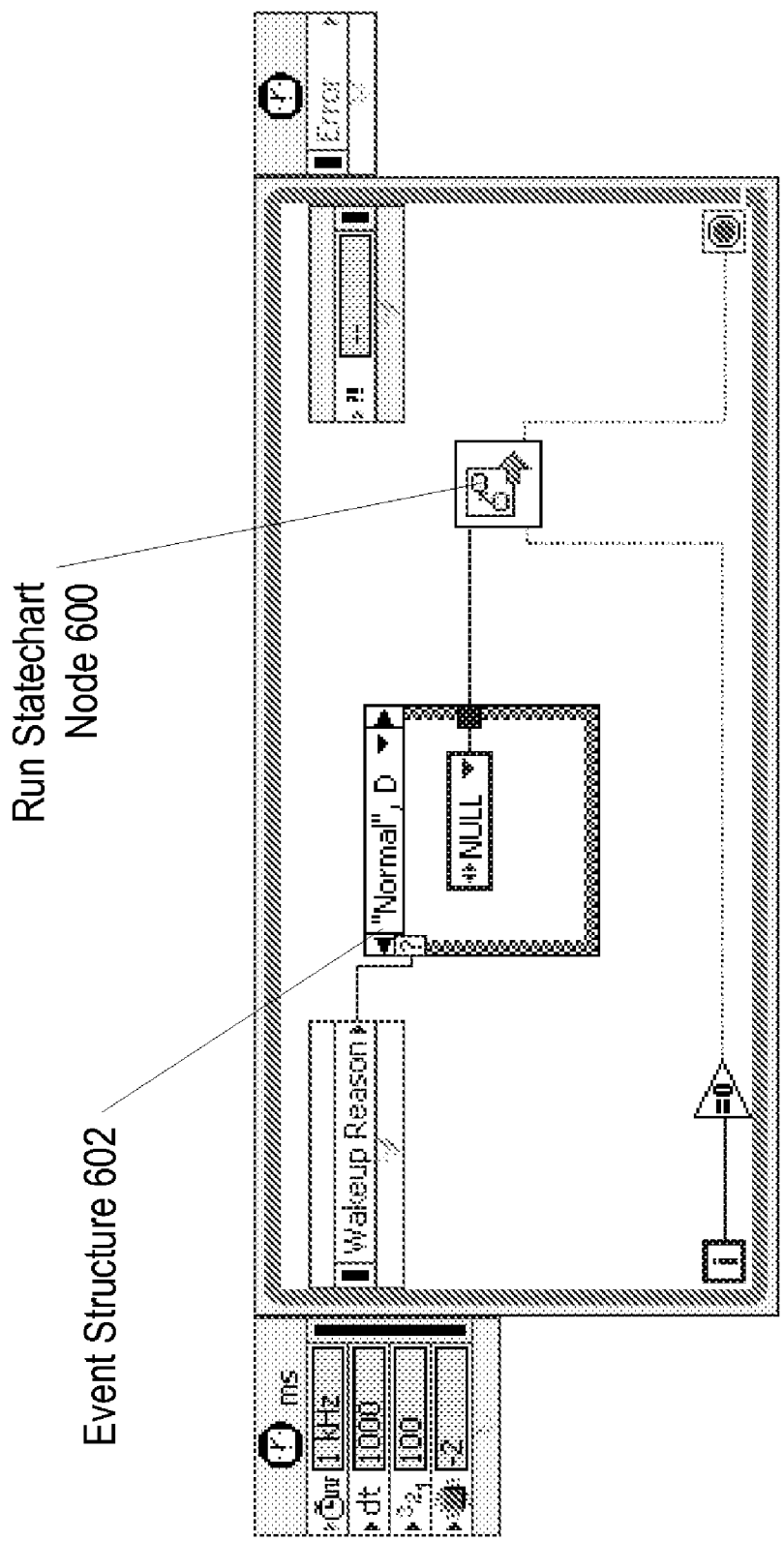

FIG. 14 illustrates an example of a caller graphical data flow program that synchronously passes trigger events to the statechart of FIG. 13. In this example, the caller graphical data flow includes a Run Statechart node 600. The caller graphical data flow program also includes an event structure 602 which is connected to an input terminal of the Run Statechart node 600. The Run Statechart node 600 and the event structure 602 are placed inside of a timed loop structure. At every iteration of the timed loop structure the event structure 602 passes an event to the Run Statechart node 600. The Run Statechart node 600 synchronously passes the event to the statechart of FIG. 13. Since the event is passed to the statechart synchronously, the statechart receives and reacts to the event immediately. In various applications it may be useful to synchronously pass events to a statechart. For example, the synchronous event mode may be useful in simulation applications or time-critical applications.

Figure 15:
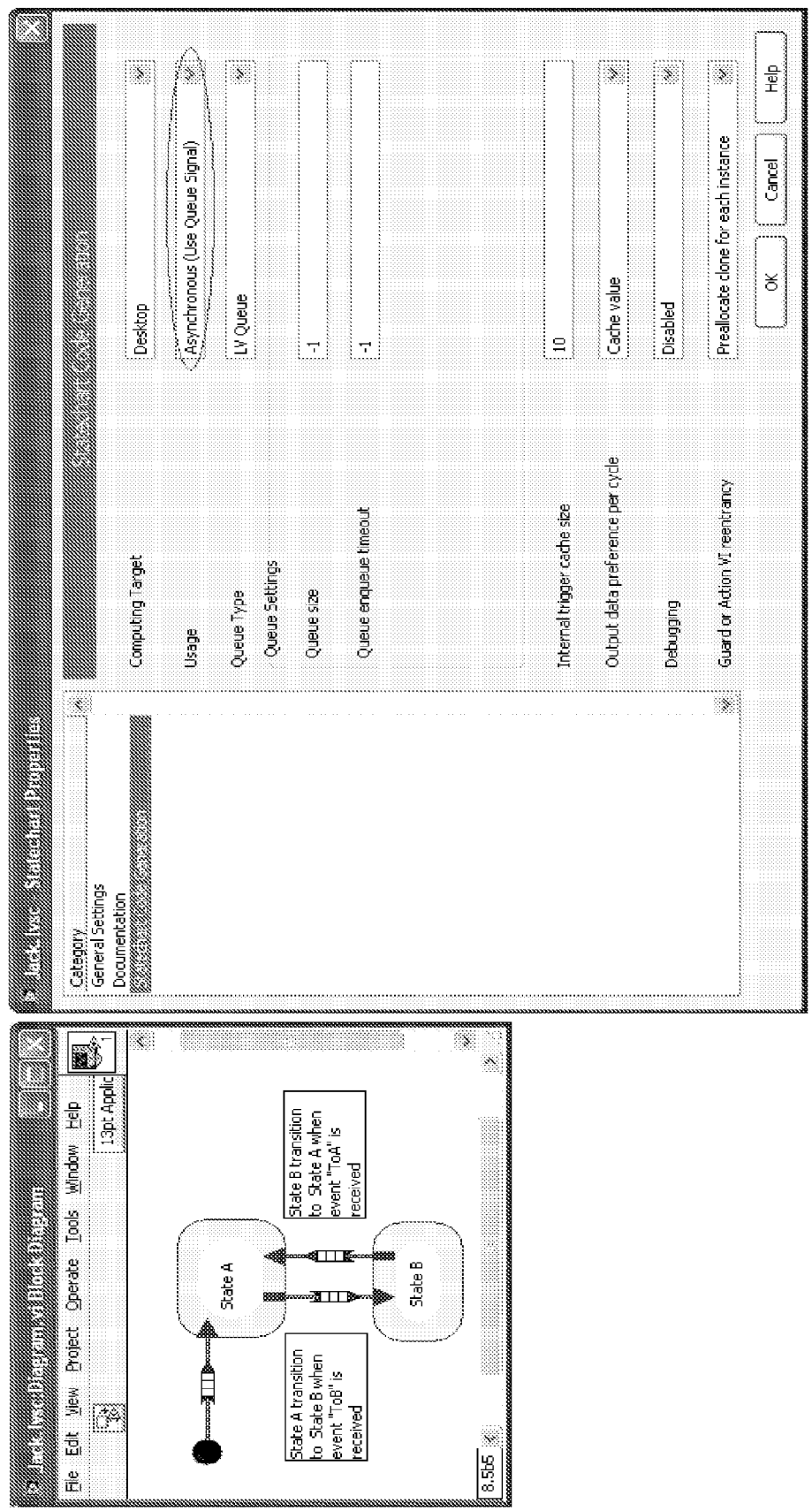
FIG. 15 illustrates the statechart of FIG. 13, where the user has now changed the event mode to the asynchronous mode instead of the synchronous mode.
Figure 16:
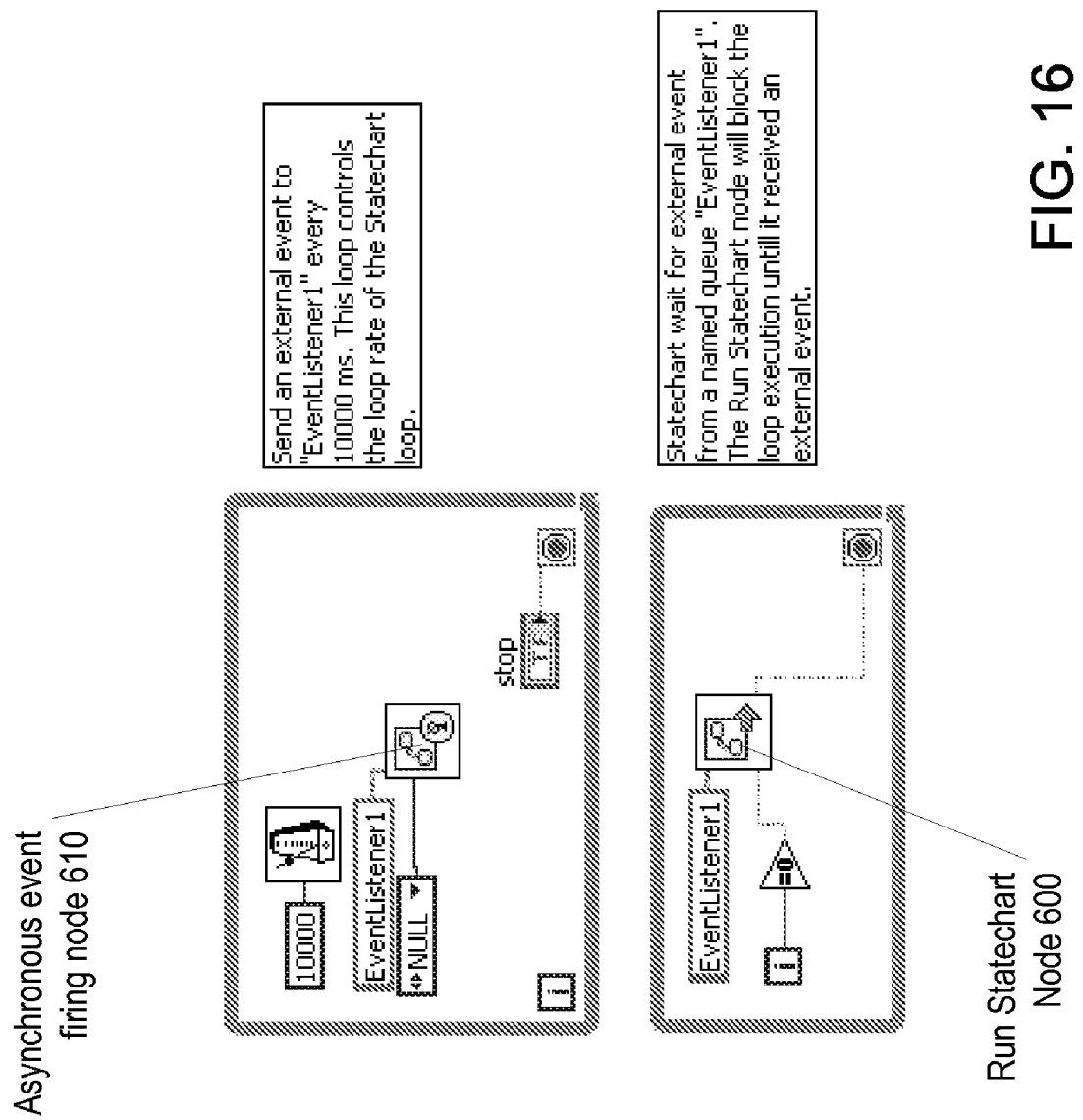
FIG. 16 illustrates an example of a caller graphical data flow program that asynchronously passes trigger events to the statechart of FIG. 13.

FIG. 15 illustrates the statechart of FIG. 13, where the user has now changed the event mode to the asynchronous mode instead of the synchronous mode. Thus, the statechart may now receive external events asynchronously instead of synchronously. FIG. 16 illustrates an example of a caller graphical data flow program that asynchronously passes trigger events to the statechart of FIG. 13. In this example, the caller graphical data flow includes two loops. The loop on the top includes an asynchronous event firing node 610. When the asynchronous event firing node executes, the node may place an event in a queue named "EventListener1" which is associated with the statechart of FIG. 13. In this example the asynchronous event firing node 610 sends places an event in the "EventListener1" queue every 10000 ms.

The bottom loop includes a Run Statechart node 600. As shown, the "EventListener1" queue has been associated with the Run Statechart node 600, which indicates that the statechart with which the Run Statechart node 600 is associated (e.g., the statechart of FIG. 15) waits for events to arrive in the "EventListener1" queue. In one embodiment the Run Statechart node 600 may block the execution of the bottom loop until an event arrives in the queue. The Run Statechart node 600 may then pass the event to the statechart, and the statechart may execute in response to the event. Thus, the top loop and the bottom loop implement a portion of graphical data flow code operable to asynchronously send events to the statechart. The time at which the event is placed in the queue is de-coupled from the time at which the event is processed by the statechart.

In various applications it may be useful to asynchronously pass events to a statechart. For example, the asynchronous event mode may be useful for applications which need to react to external events in an asynchronous manner, such as applications which process graphical user interface events that are generated in response to user input to a graphical user interface.

Figure 16A:
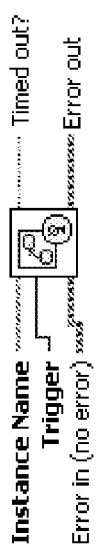
FIG. 16A illustrates one embodiment of the asynchronous event firing node shown in FIG. 16 in more detail.

FIG. 16A illustrates one embodiment of the asynchronous event firing node 610 shown in FIG. 16 in more detail. The asynchronous event firing node 610 may be linked to a particular statechart by right-clicking on the node to display a context menu that includes a "Link to Statechart" menu item. In some embodiments the graphical programming development environment may prompt the user to select which statechart to link the node to.

In some embodiments, the asynchronous event firing node 610 shown in FIG. 16 may be provided to users by a graphical programming development environment, e.g., so that users can include the asynchronous event firing node 610 in a graphical program and configure the node to asynchronously pass trigger events to a statechart. For example, in some embodiments the graphical programming development environment may be operable to display a palette of various types of nodes. The user may include the asynchronous event firing node 610 in a graphical program by dragging it from a palette and dropping it into the block diagram of a graphical program.

In other embodiments the graphical programming development environment may be operable to automatically include the asynchronous event firing node 610 in a graphical program and automatically configure the asynchronous event firing node 610 to communicate with a statechart. For example, in one embodiment the user may include a Run Statechart node 600 such as shown in FIG. 16 in the graphical program. The user may then right-click on the Run Statechart node 600 to cause a context menu to appear, where the context menu includes a "Create Send Statechart Event Function" menu item. In response to the user selecting this menu item the graphical programming development environment may automatically include and display an instance of the asynchronous event firing node 610 in the graphical program and configure the asynchronous event firing node 610 to communicate with the statechart with which the Run Statechart node 600 is associated.

Referring again to FIG. 16A, as shown, the asynchronous event firing node 610 includes an "Instance Name" input terminal. This input specifies the instance of the statechart to which the node sends events. The value of this parameter matches the value of the Instance Name input of a Run Statechart node 600 in the graphical program.

The asynchronous event firing node 610 also includes a "Trigger" input terminal. This input specifies the trigger event to send to the statechart specified by the Instance Name input parameter. To select a trigger, the user may right-click the Trigger input terminal to cause a context menu to appear. The user may select a Create Control or Create Constant menu item from the context menu, which causes a list of available triggers to appear. The user may then select the desired trigger from the list. (The trigger events that appear in the list may be defined by the user using a separate window or graphical user interface for defining trigger events.)

The asynchronous event firing node 610 also includes an "error in" input terminal which specifies error conditions that exist prior to executing the asynchronous event firing node 610.

The asynchronous event firing node 610 also includes a "Timed Out" output terminal that returns True if the node fails to send the specified event in time or returns False if the node sends the specified event in time.

The asynchronous event firing node 610 also includes an "error out" output terminal which specifies error conditions that exist after executing the asynchronous event firing node 610.

As noted above, in some embodiments the statechart development environment may be operable to automatically convert a statechart into a graphical data flow program. In various embodiments the statechart development environment may be operable to convert the statechart into the graphical data flow program in any of various ways, e.g., based on various kinds of execution models, and where the graphical data flow program may execute in any desired graphical programming execution environment.

Figure 18:
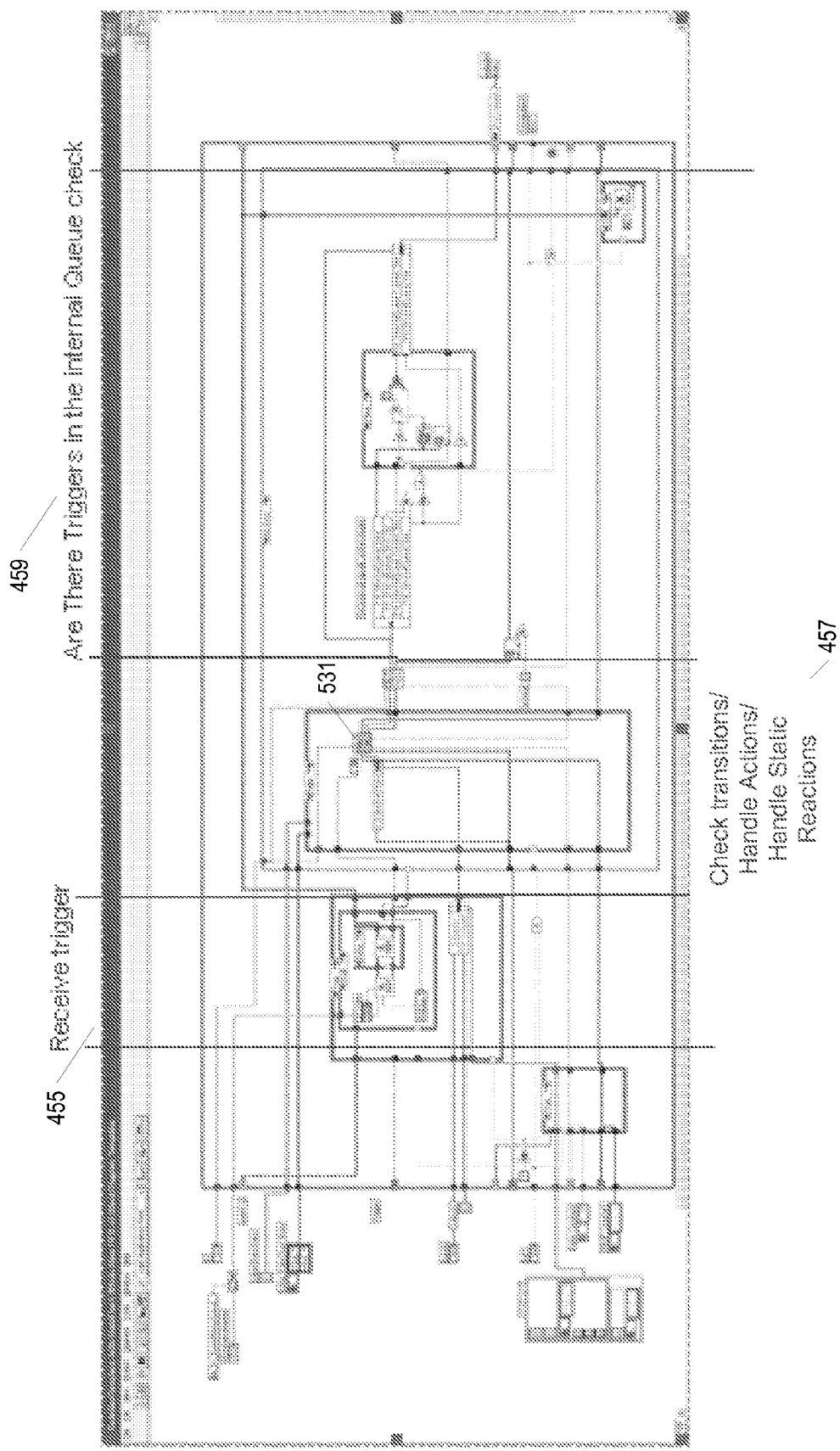
FIGS. 18, 18A, 18B, 18C and 22-25 illustrate an example of a LabVIEW graphical data flow program that is automatically generated from a statechart, where the LabVIEW program operates according to the evaluation model of FIGS. 17 and 19-21.

In some embodiments the automatically generated graphical data flow may be hierarchically organized. For example, the graphical data flow may include a top-level block diagram that includes various sub-program nodes, where the sub-program nodes represent other block diagrams. FIG. 18 illustrates an example of top-level or main block diagram of a LabVIEW graphical data flow program. The LabVIEW graphical data flow program illustrates an example of how a statechart may be automatically converted into graphical data flow code for the LabVIEW graphical programming development environment. This main block diagram of FIG. 18 includes sub-program nodes which encapsulate other block diagrams, as described below.

Figure 17:
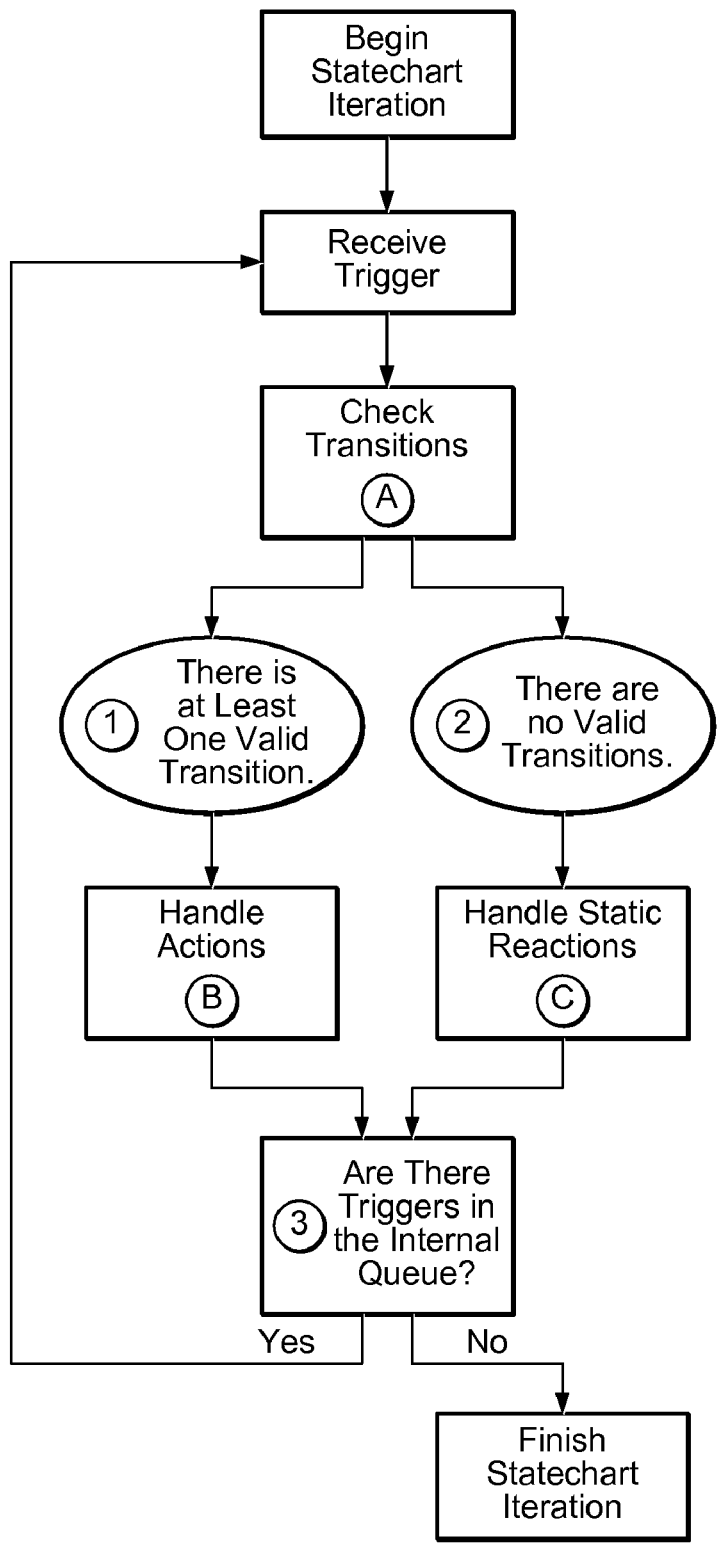
FIGS. 17 and 19-21 illustrate an example of an evaluation model for evaluating a single iteration of a statechart, according to one embodiment.

FIG. 17 illustrates an example of an evaluation model for evaluating a single iteration of a statechart, according to one embodiment. The main block diagram shown in FIG. 18 is based on the evaluation model of FIG. 17 and executes according to this evaluation model. The main block diagram of FIG. 18 may be executed iteratively, where each iteration represents an iteration of the statechart.

In FIG. 17, block 431 represents the beginning of an iteration of the statechart. As indicated in 433, a trigger event is received at the beginning of the iteration. In 435, the transitions associated with the current state and the received trigger are checked to see whether any of the transitions should be followed. As discussed above, the validity of the transitions may be determined based on their associated guard conditions.

If there are no valid transitions as indicated in 437 then the static reactions configured for the current state may be executed, as indicated in 439. As discussed above, each static reaction may be performed only if its corresponding guard evaluates to True.

Otherwise, if there is at least one valid transition as indicated in 441 then the appropriate exit and entry actions determined by following the valid transition(s) may be executed, as indicated in 443.

At the end of the cycle, a check may be performed to see whether other internal trigger events have been received. If so, then another iteration may be performed. Otherwise the iteration may end until another internal or external trigger event is received, as indicated in 447.

To aid in understanding operation of the main block diagram of FIG. 18, vertical lines have been drawn through the block diagram, which divide the block diagram into 3 areas labeled with captions 455, 457, and 459.

Figure 18A:
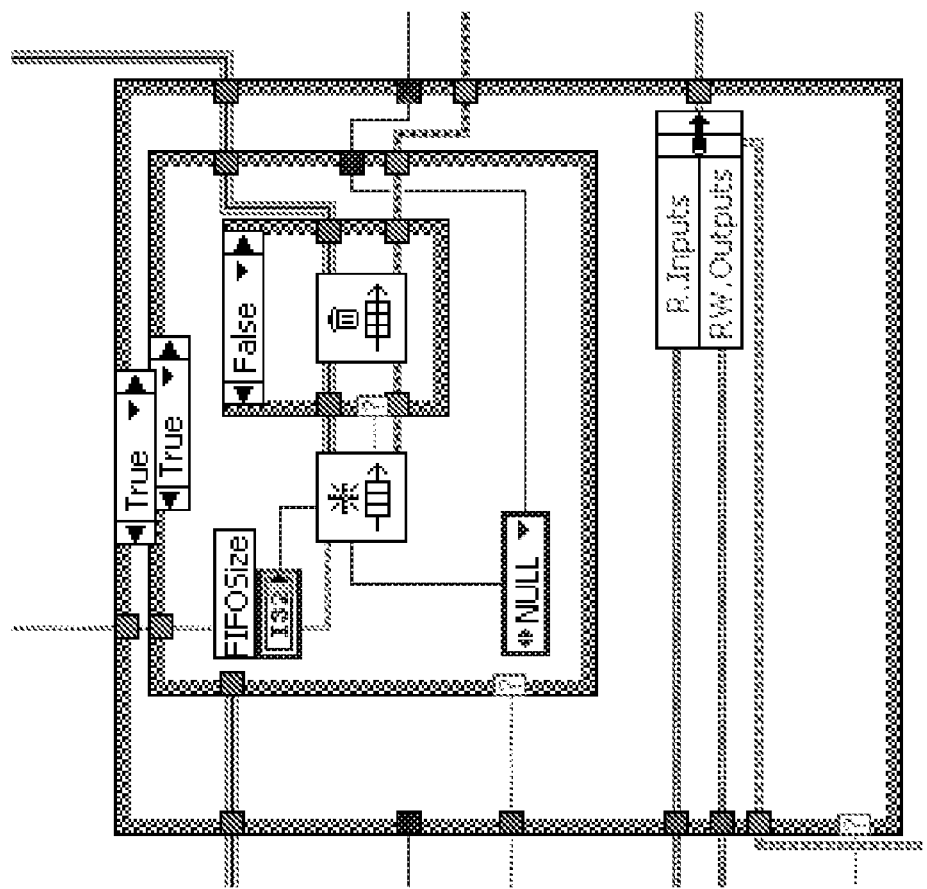

As indicated by caption 455, the left-most portion of the block diagram of FIG. 18 executes to receive the trigger (block 443 of FIG. 17). FIG. 18A illustrates the left-most portion of the block diagram of FIG. 18 in greater detail.

Figure 18B:
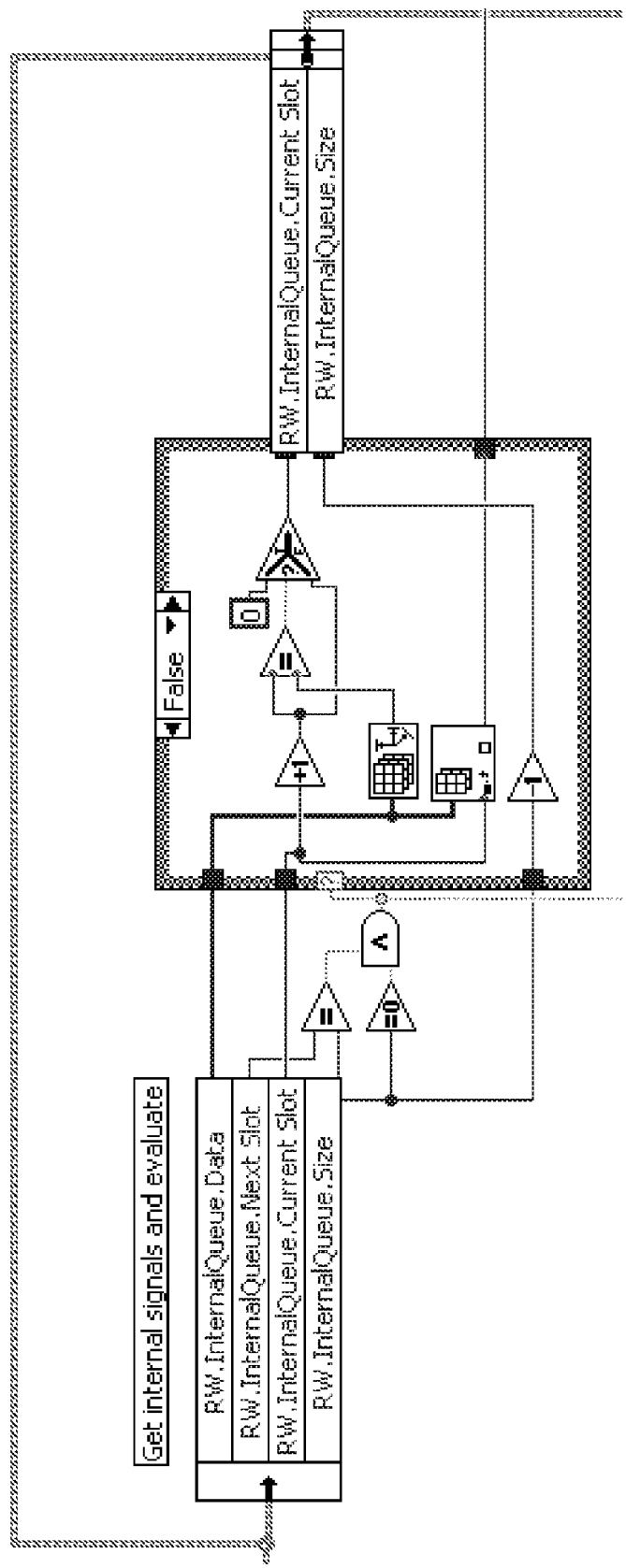
Figure 18C:
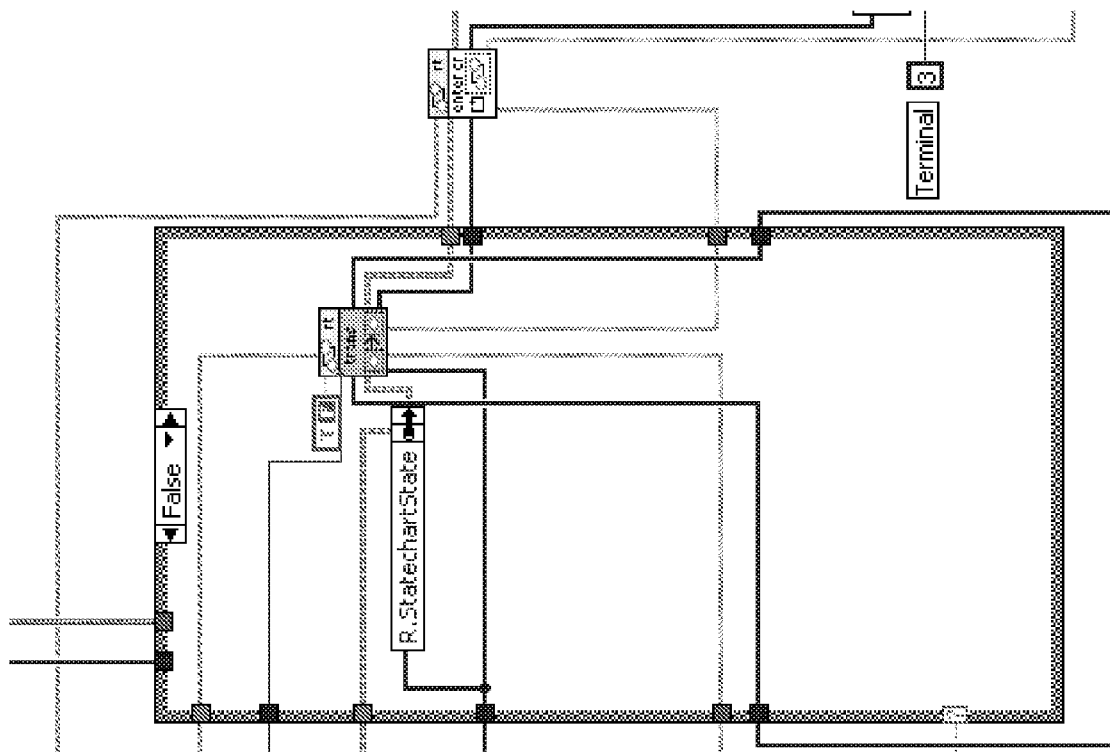

As indicated by caption 457, the middle portion of the block diagram of FIG. 18 executes to check transitions, handle actions, and handle static seactions (blocks 435, 443, 439 of FIG. 17). FIG. 18C illustrates the middle portion of the block diagram of FIG. 18 in greater detail.

As indicated by caption 459, the right-most portion of the block diagram of FIG. 18 executes to check for other internal triggers (block 445 of FIG. 17). FIG. 18B illustrates the right-most portion of the block diagram of FIG. 18 in greater detail.

Figure 19:
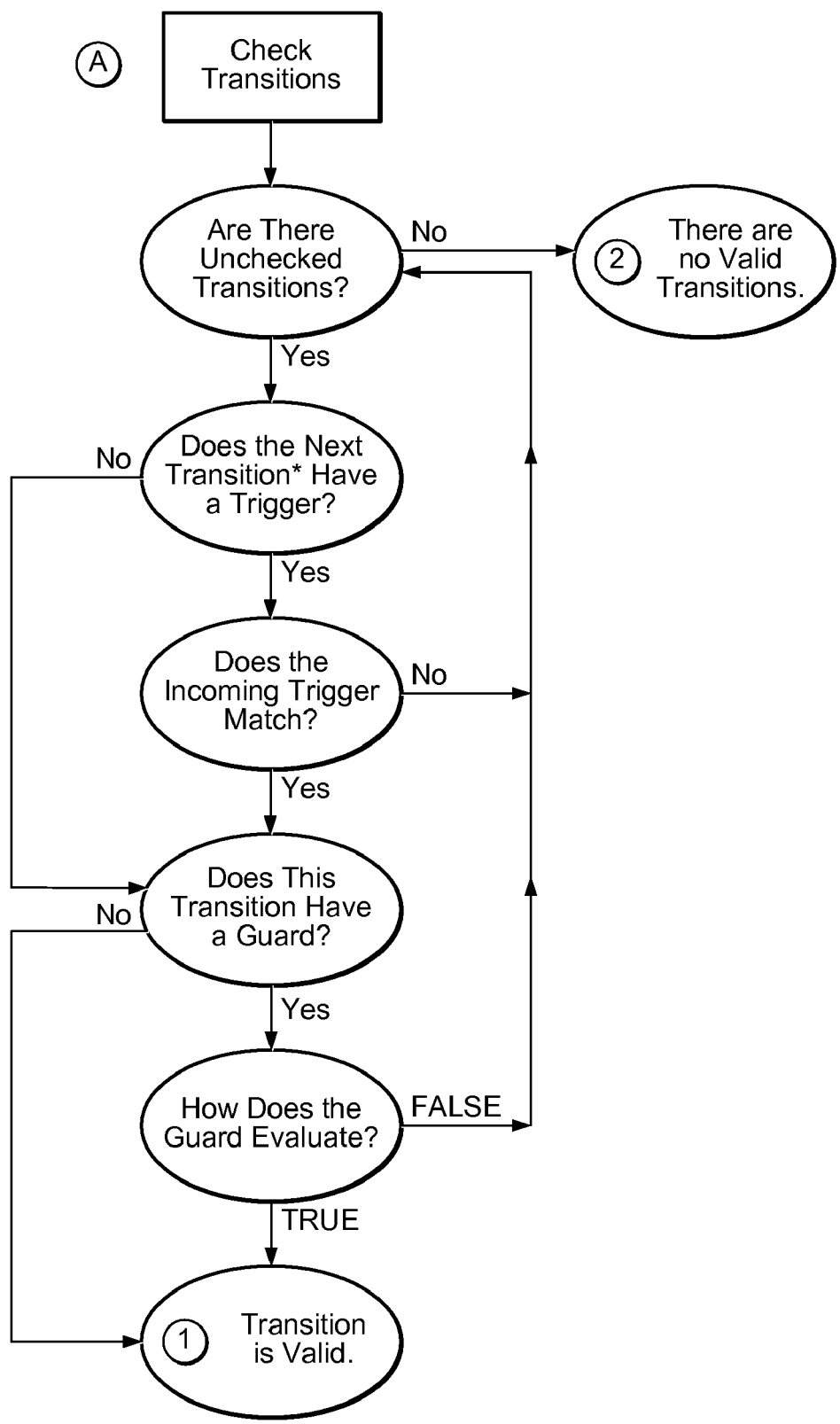

FIG. 19 illustrates block 435 of FIG. 17 in more detail. The operations shown in FIG. 19 may be performed when a trigger event is received to determine whether there are any valid transitions. In 461, a check is made to see whether any transitions have not yet been checked. If not then there are no valid transitions, as indicated in 463. Otherwise, a check is made to see whether the next transition (the next one that has not yet been checked) has an associated trigger event, as indicated in 465. If so then a check is made to see whether the trigger event for the transition matches the trigger event that was received. If not then the transition is not valid and thus, the process continues at block 461.

If the trigger event for the transition does match the trigger event that was received or if the transition is not configured with a trigger event then a check is made to see whether the transition has a guard, as indicated in 471. If so then the guard is evaluated, as indicated in 471. If the guard evaluates to False then the transition is not valid and thus, the process continues at block 461.

If the guard evaluates to True or if the transition does not have a guard then the transition is determined to be valid, as indicated in 473.

Figure 20:
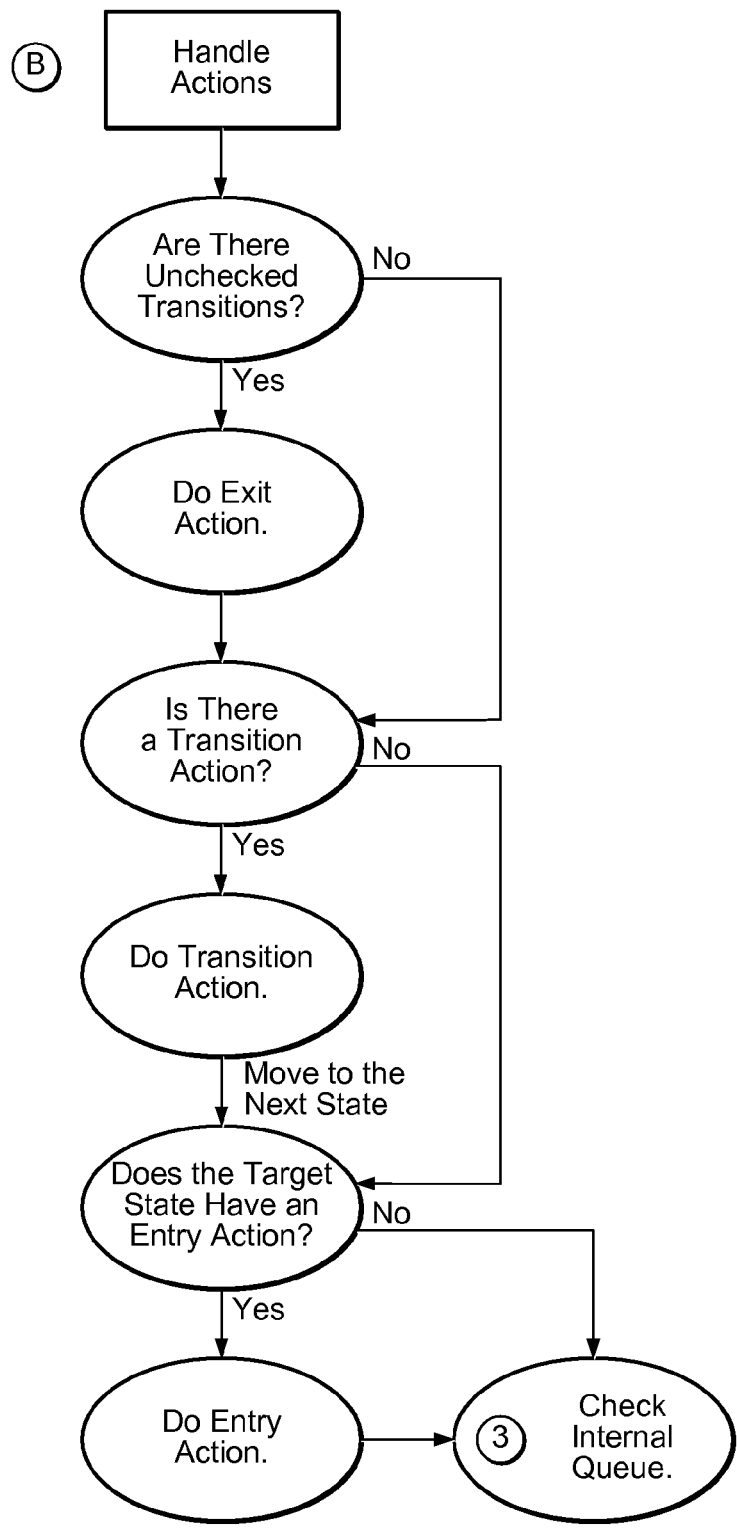

FIG. 20 illustrates block 443 of FIG. 17 in more detail. The operations shown in FIG. 20 may be performed when a valid transition is found. A check is made to see whether the current state (i.e., the state before the transition is taken) has an exit action, as indicated in 481. If so then the exit action is executed, as indicated in 483. After the exit action is performed or if there is no exit action, a check is made to see whether the transition has an action, as indicated in 485. If so then the transition action is executed, as indicated in 487. After the transition action is performed or if there is no transition action, a check is made to see whether the destination state has an entry action, as indicated in 489. If so then the entry action is executed, as indicated in 491. After the entry action is performed or if there is no entry action, a check is made to see whether any internal triggers have been received, as indicated in 445.

Figure 21:
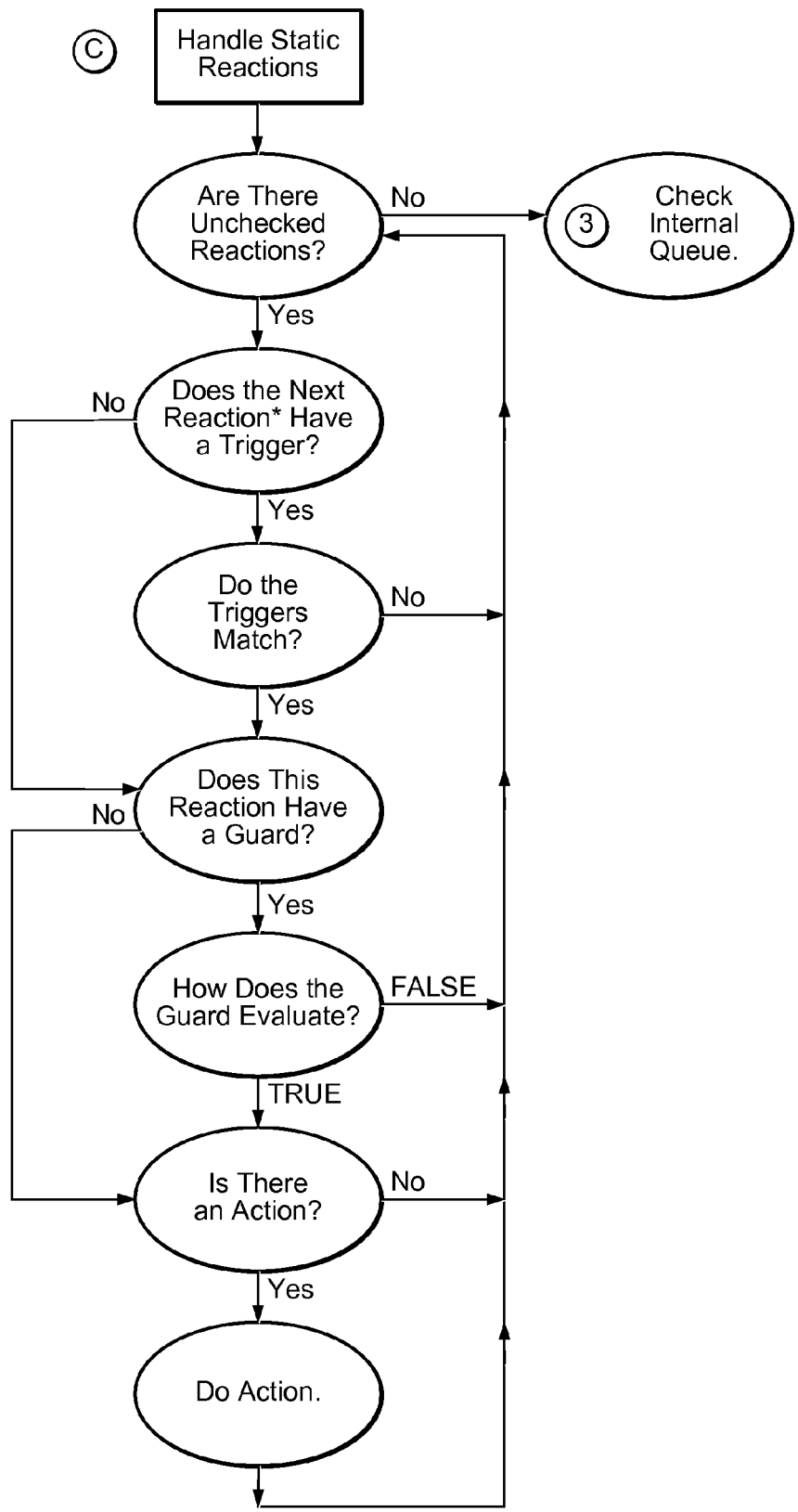

FIG. 21 illustrates block 439 of FIG. 17 in more detail. The operations shown in FIG. 21 may be performed when no valid transition is found. In 511, a check is made to see whether any static reactions have not yet been checked. If not then there are no more static reactions to check, and the queue may be checked for internal trigger events, as indicated in 445. Otherwise, a check is made to see whether the next static reaction (the next one that has not yet been checked) has an associated trigger event, as indicated in 513. If so then a check is made to see whether the trigger event for the static reaction matches the trigger event that was received, as indicated in 515. If not then the static reaction is not valid and thus, the process continues at block 511.

If the trigger that was received matches the trigger configured for the static reaction or if no trigger is configured for the static reaction then a check is made to see whether the static reaction has a guard, as indicated in 517. If so then the guard is evaluated, as indicated in 519. If the guard evaluates to False then the static reaction is not valid and thus, the process continues at 511.

If the guard evaluates to True or if the static reaction does not have a guard then an action defined for the static reaction may be executed, as indicated in 521 and 523.

Figure 22:
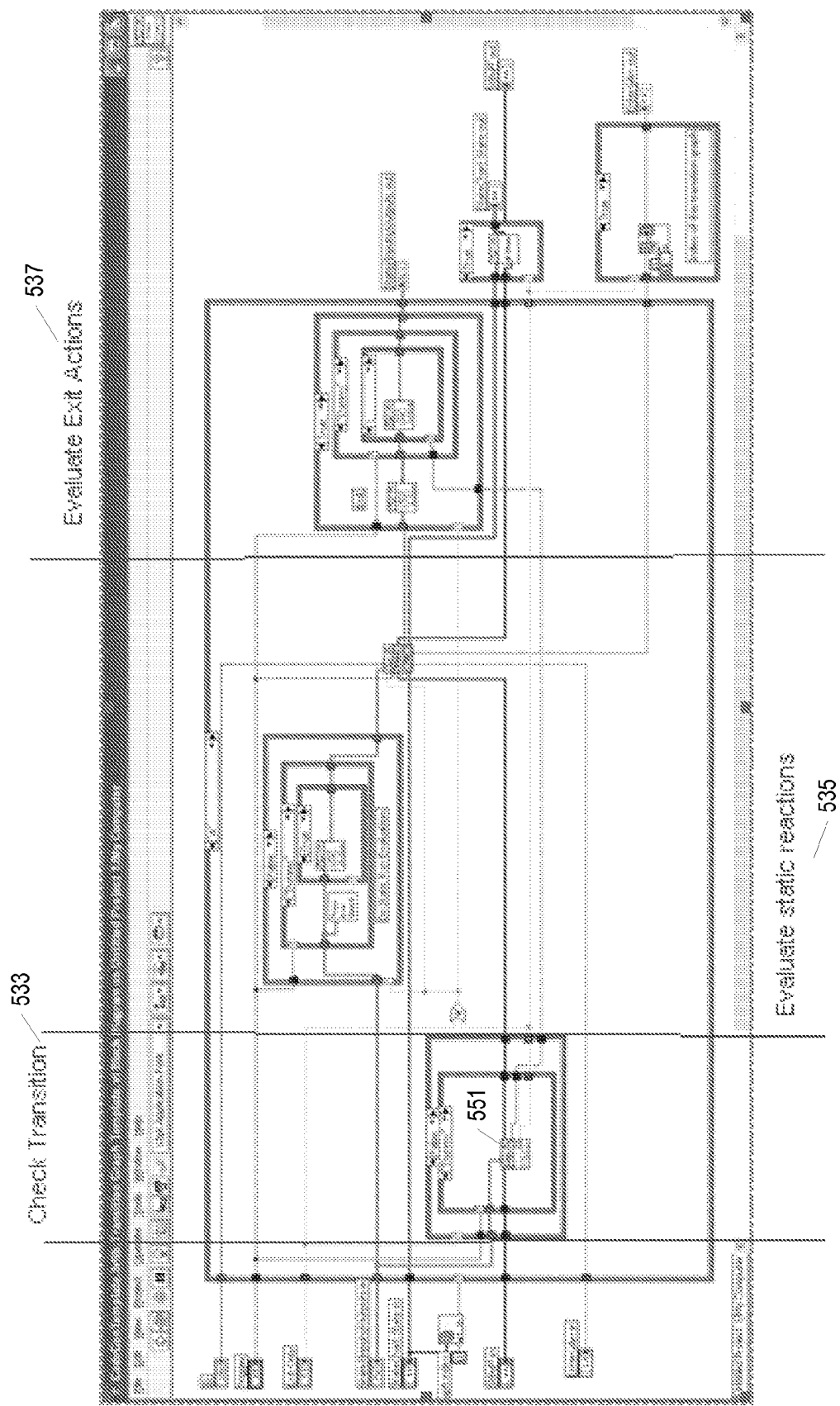

The processes shown in FIGS. 19, 20, and 21 may be implemented by the block diagram shown in FIG. 22. The block diagram of FIG. 22 is encapsulated by the sub-program node 531 in the block diagram of FIG. 18. To aid in understanding operation of the block diagram of FIG. 22, vertical lines have been drawn through the block diagram, which divide the block diagram into 3 areas labeled with captions 533, 535, and 537.

Figure 23:
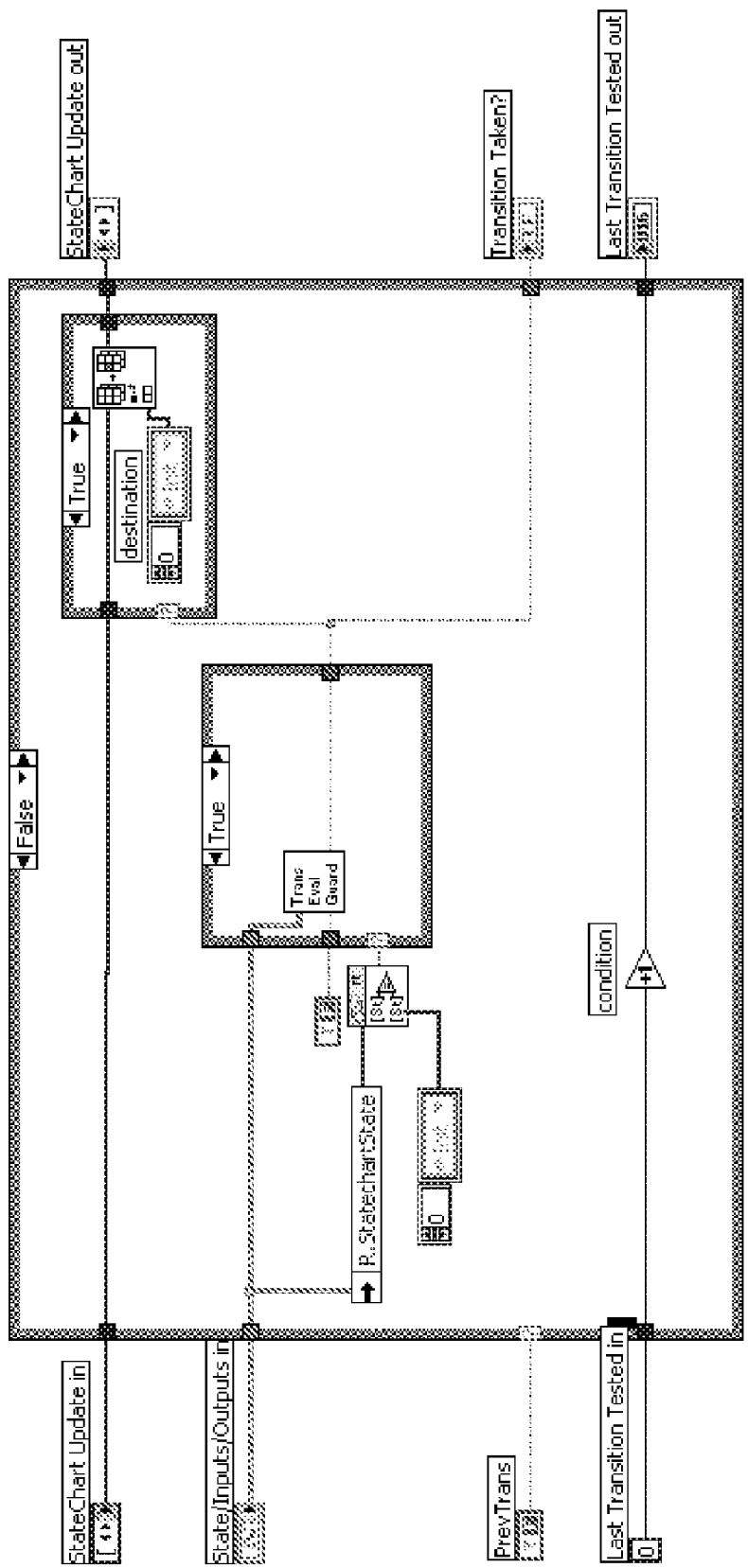

As indicated by caption 533, the left-most portion of the block diagram of FIG. 22 executes to check for valid transitions when a trigger event is received, which may be performed above as discussed with reference to FIG. 19. The left-most portion of the block diagram of FIG. 22 includes a sub-program node 551. FIG. 23 illustrates the block diagram encapsulated by the node 551, which executes to check for valid transitions. This example represents the graphical data flow code that is generated if there is only one transition. If there are multiple transitions then the graphical data flow code may be replicated for each transition.

If a valid transition is found then the right-most portion of the block diagram of FIG. 22 executes the exit actions (blocks 481 and 483 of FIG. 20).

Figure 24:
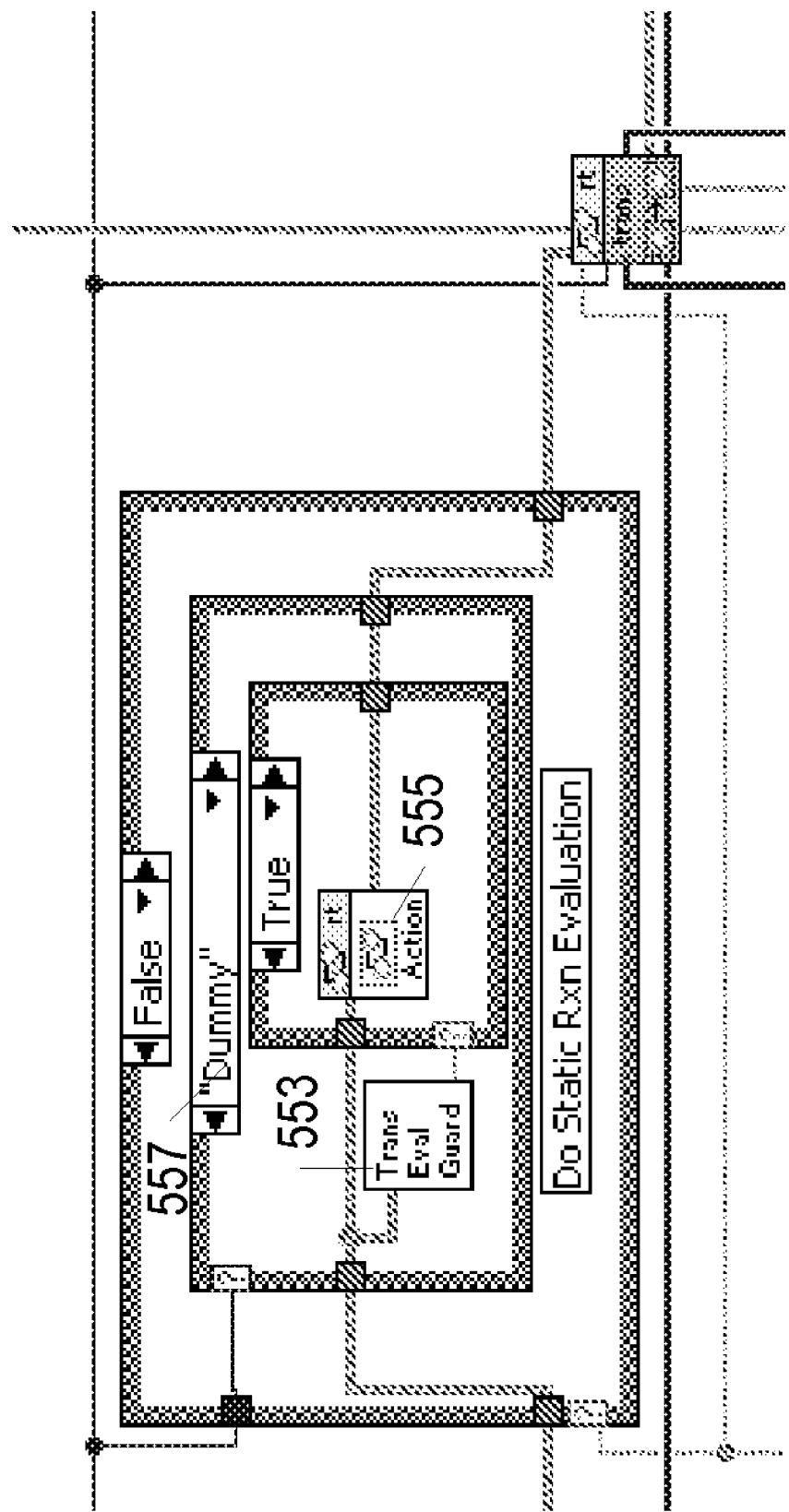

If no valid transition is found then the middle portion of the block diagram of FIG. 22 executes the static reactions for the current state, which may be performed as discussed above with reference to FIG. 21. FIG. 24 illustrates an enlargement of the graphical data flow code that executes the static reactions. As discussed above, for a given static reaction, the user may specify a portion of graphical data flow code that defines the guard condition for the static reaction, as well as a portion of graphical data flow code that defines the action to perform if the guard evaluates to True (or the action to perform if the user does not specify a guard). In the code shown in FIG. 24, the sub-program node 553 encapsulates the graphical data flow code that the user specified for the guard, and the sub-program node 555 encapsulates the graphical data flow code that the user specified for the action. Note that FIG. 24 illustrates 3 nested LabVIEW case structure. Thus the illustrated portion of code corresponds to the currently selected case in each case structure. Each trigger may have a corresponding case in the case structure 557.

Figure 25:
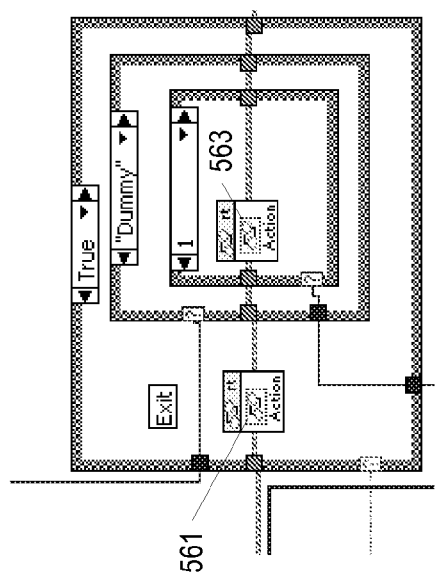

Referring again to FIG. 22, if a valid transition is found then the right-most portion of the block diagram of FIG. 22 executes the exit actions for the current state and transition actions for the valid transition, which may be performed as discussed with reference to FIG. 20. FIG. 25 illustrates an enlargement of the graphical data flow code that executes the exit actions and transition actions. The sub-program nodes 561 and 563 may encapsulate graphical data flow code specified by the user for the exit actions and transition actions, respectively.

Thus, the block diagrams of FIGS. 18 and 22-25 illustrate an example of how LabVIEW graphical data flow code may be generated to model a statechart. It is noted that the illustrated block diagrams may differ somewhat for different statecharts. For example, various constants used in the block diagrams may be replaced, e.g., depending on which trigger events the user has defined. Similarly, the case structures may have different numbers of cases, depending on which trigger events the user has defined. Also, these block diagrams represent examples for a relatively simple state, e.g., where only one static reaction is defined, only one transition is defined, etc. For more complicated states, the corresponding graphical data flow may increase in complexity or amount.

In some embodiments the statechart development environment may utilize template block diagrams which already include various portions of graphical data flow code illustrated in the block diagrams discussed above. For example, instead of automatically generating the entire graphical data flow program, in some embodiments the statechart development environment may use existing template block diagrams, e.g., by modifying constant values, adding cases to case structures, or making other modifications as appropriate for a particular statechart. In other embodiments the statechart development environment may create the entire graphical data flow program from a blank program.

Figure 26:
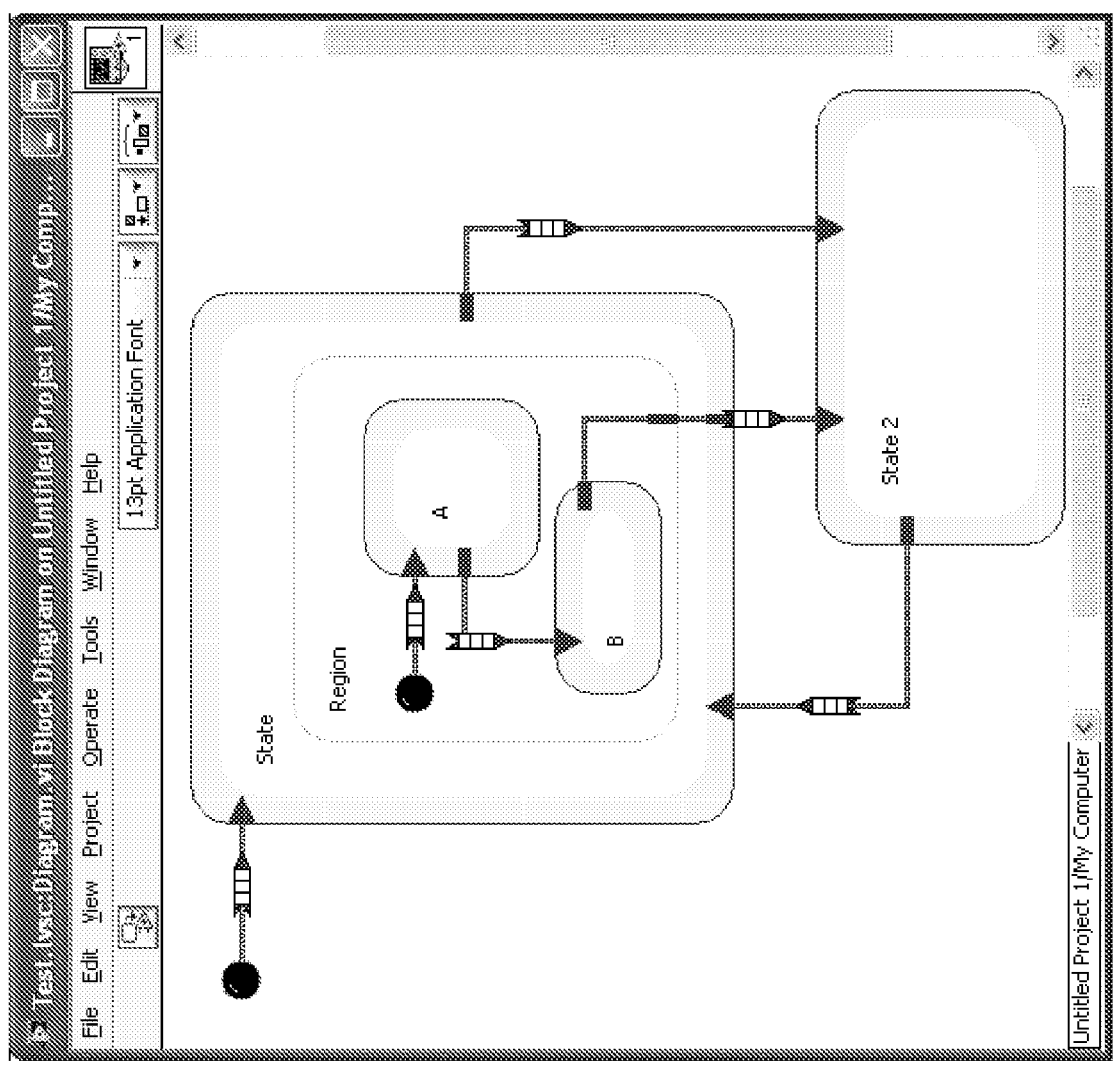
FIGS. 26-28 illustrate an example of how a statechart including a hierarchical state may be automatically converted into a graphical data flow program.
Figure 27:
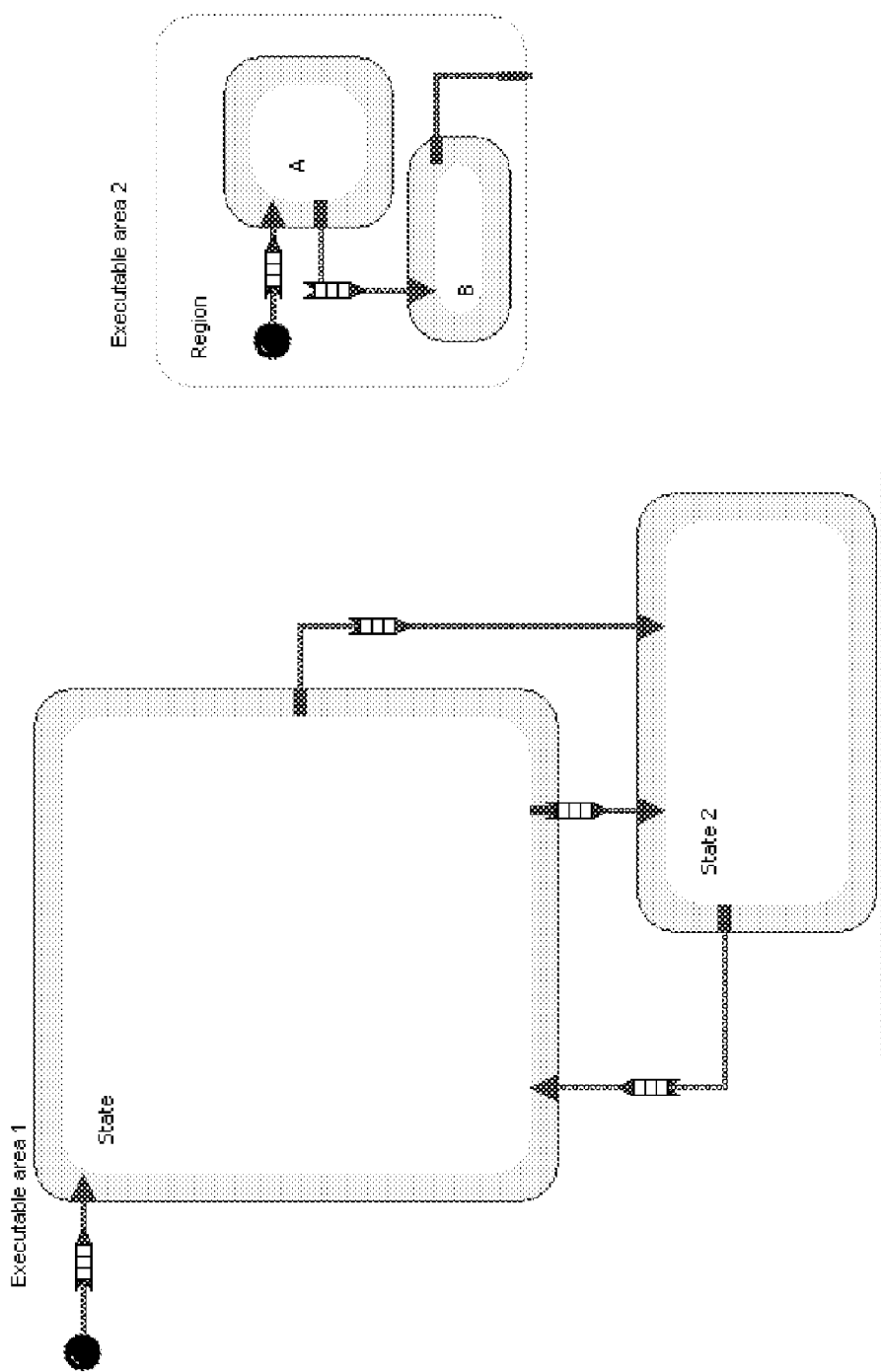

As an example of how a statechart including a hierarchical state is automatically converted into a graphical data flow program, consider the example statechart of FIG. 26. This statechart includes a hierarchical state (labeled as "State") with two sub-states (labeled as "A" and "B"). As shown in FIG. 27, from the point of view of code generation the statechart is considered as having two executable areas, labeled as "Executable Area 1" and "Executable Area 2". For each executable area, a corresponding block diagram similar to the block diagram of FIG. 18 is generated.

Figure 28:
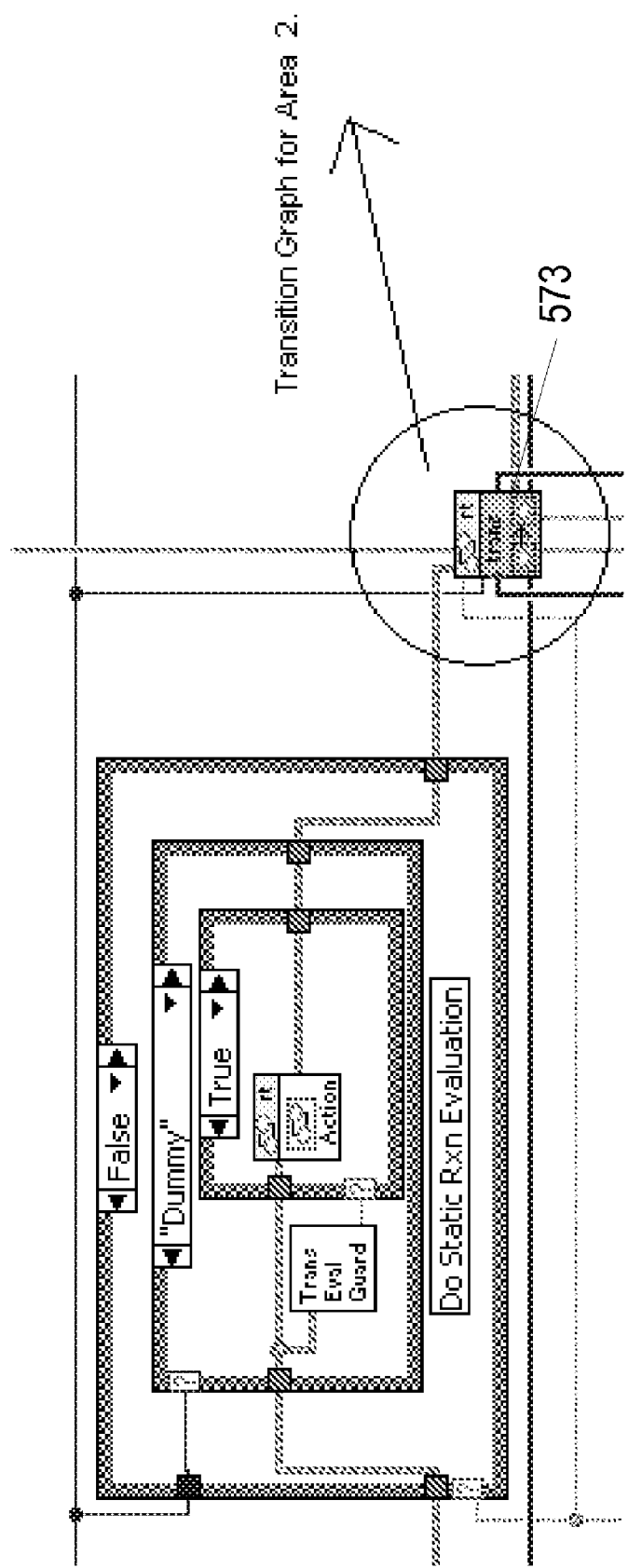

FIG. 28 illustrates a portion of the block diagram that is generated for the "Executable Area 1" executable area. This portion of the block diagram processes static reactions, similarly as discussed above with reference to FIG. 24. As shown, the block diagram includes a sub-program node 573. This sub-program node encapsulates the block diagram that is generated for the "Executable Area 2" executable area. If opened and displayed, this block diagram would appear similar to the block diagram of FIG. 18. Thus, when the static reactions for a hierarchical state or superstate that has sub-states are evaluated, a sub-program node that encapsulates a block diagram for the sub-states may be invoked. This model may allow any statechart having one or more hierarchical states to be converted to a graphical data flow program.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method comprising:
a computer system executing program instructions to create a statechart in response to user input, wherein creating the statechart comprises displaying a plurality of state icons on a display device in response to user input and displaying a plurality of connector elements interconnecting the state icons on the display device in response to user input, wherein the state icons represent a plurality of states and wherein the connector elements represent transitions between the states, wherein the statechart includes one or more hierarchical states, wherein each of the one or more hierarchical states includes one or more sub-states, wherein the statechart specifies first functionality; and
the computer system executing program instructions to automatically generate a graphical data flow program from the statechart, wherein the graphical data flow program includes a plurality of interconnected nodes that visually indicate functionality of the graphical data flow program, wherein connections among the nodes visually indicate data flow among the nodes, wherein the graphical data flow program implements the first functionality;
wherein the one or more hierarchical states include a first hierarchical state having one or more sub-states, wherein automatically generating the graphical data flow program comprises automatically generating a first block diagram and including a first sub-program node in the first block diagram, wherein the first sub-program node encapsulates a second block diagram corresponding to the one or more sub-states of the first hierarchical state.

2. The method of claim 1, further comprising:
the computer system executing the graphical data flow program to perform the first functionality specified by the statechart.

3. The method of claim 1,
wherein said automatically generating the graphical data flow program comprises automatically generating graphical data flow code for checking for received trigger events.

4. The method of claim 1,
wherein said automatically generating the graphical data flow program comprises automatically generating graphical data flow code for checking for valid transitions in response to receiving a trigger event.

5. The method of claim 4,
wherein said automatically generating the graphical data flow program further comprises automatically generating graphical data flow code for performing one or more static reactions if no valid transition is found.

6. The method of claim 4,
wherein said automatically generating the graphical data flow program further comprises automatically generating graphical data flow code for performing one or more exit actions for a current state if a valid transition is found.

7. The method of claim 4,
wherein said automatically generating the graphical data flow program further comprises automatically generating graphical data flow code for performing one or more entry actions for a destination state if a valid transition is found.

8. The method of claim 1,
wherein said automatically generating the graphical data flow program comprises automatically encapsulating the graphical data flow program in a graphical program node.

9. The method of claim 8,
wherein the automatically generated graphical data flow program comprises a first graphical program;
wherein the method further comprises the computer system executing program instructions to include the graphical program node in a second graphical program to configure the second graphical program to invoke the statechart.

10. A non-transitory computer-readable memory medium storing program instructions executable to:
create a statechart in response to user input, wherein creating the statechart comprises displaying a plurality of state icons on a display device in response to user input and displaying a plurality of connector elements interconnecting the state icons on the display device in response to user input, wherein the state icons represent a plurality of states and wherein the connector elements represent transitions between the states, wherein the statechart includes one or more hierarchical states, wherein each of the one or more hierarchical states includes one or more sub-states, wherein the statechart specifies first functionality; and
automatically generate a graphical data flow program from the statechart, wherein the graphical data flow program includes a plurality of interconnected nodes that visually indicate functionality of the graphical data flow program, wherein connections among the nodes visually indicate data flow among the nodes, wherein the graphical data flow program implements the first functionality;
wherein the one or more hierarchical states include a first hierarchical state having one or more sub-states, wherein automatically generating the graphical data flow program comprises automatically generating a first block diagram and including a first sub-program node in the first block diagram, wherein the first sub-program node encapsulates a second block diagram corresponding to the one or more sub-states of the first hierarchical state.

11. The computer-readable memory medium of claim 10, wherein the program instructions are further executable to:
execute the graphical data flow program to perform the first functionality specified by the statechart.

12. The computer-readable memory medium of claim 10,
wherein said automatically generating the graphical data flow program comprises automatically generating graphical data flow code for checking for received trigger events.

13. The computer-readable memory medium of claim 10,
wherein said automatically generating the graphical data flow program comprises automatically generating graphical data flow code for checking for valid transitions in response to receiving a trigger event.

14. The computer-readable memory medium of claim 13,
wherein said automatically generating the graphical data flow program further comprises automatically generating graphical data flow code for performing one or more static reactions if no valid transition is found.

15. The computer-readable memory medium of claim 13, wherein said automatically generating the graphical data flow program further comprises automatically generating graphical data flow code for performing one or more exit actions for a current state if a valid transition is found.

16. The computer-readable memory medium of claim 13, wherein said automatically generating the graphical data flow program further comprises automatically generating graphical data flow code for performing one or more entry actions for a destination state if a valid transition is found.

17. The computer-readable memory medium of claim 10, wherein said automatically generating the graphical data flow program comprises automatically encapsulating the graphical data flow program in a graphical program node.

18. A computer system comprising:
one or more processors;
memory storing program instructions;
an input device; and
a display device;
wherein the program instructions are executable by the one or more processors to:
create a statechart in response to user input, wherein creating the statechart comprises displaying a plurality of state icons on the display device in response to user input and displaying a plurality of connector elements interconnecting the state icons on the display device in response to user input, wherein the state icons represent a plurality of states and wherein the connector elements represent transitions between the states, wherein the statechart includes one or more hierarchical states, wherein each of the one or more hierarchical states includes one or more sub-states, wherein the statechart specifies first functionality; and
automatically generate a graphical data flow program from the statechart, wherein the graphical data flow program includes a plurality of interconnected nodes that visually indicate functionality of the graphical data flow program, wherein connections among the nodes visually indicate data flow among the nodes, wherein the graphical data flow program implements the first functionality;
wherein the one or more hierarchical states include a first hierarchical state having one or more sub-states, wherein automatically generating the graphical data flow program comprises automatically generating a first block diagram and including a first sub-program node in the first block diagram, wherein the first sub-program node encapsulates a second block diagram corresponding to the one or more sub-states of the first hierarchical state.

\* \* \* \* \*